US012655507B2

(12) United States Patent
Henrion et al.

(10) Patent No.: US 12,655,507 B2
(45) Date of Patent: Jun. 16, 2026

(54) HOT-ROLLED AND COATED STEEL SHEET FOR HOT-STAMPING, HOT-STAMPED COATED STEEL PART AND METHODS FOR MANUFACTURING THE SAME

(71) Applicant: ArcelorMittal, Luxembourg (LU)

(72) Inventors: Thomas Henrion, Valmont (FR);
Ronan Jacolot, Landonvillers (FR);
Martin Beauvais, Marange Silvange (FR)

(73) Assignee: ArcelorMittal, Luxembourg (LU)

( * ) Notice: Subject to any disclaimer, the term of this patent is extended or adjusted under 35 U.S.C. 154(b) by 229 days.

(21) Appl. No.: 18/095,520

(22) Filed: Jan. 10, 2023

(65) Prior Publication Data

US 2023/0167557 A1     Jun. 1, 2023

Related U.S. Application Data

(63) Continuation of application No. 16/349,864, filed as application No. PCT/IB2017/057370 on Nov. 23, 2017, now Pat. No. 12,545,982.

(30) Foreign Application Priority Data

Nov. 24, 2016     (WO) .................. PCT/IB2016/057100

(51) Int. Cl.
*C22C 38/50*          (2006.01)
*B21D 22/02*          (2006.01)
(Continued)

(52) U.S. Cl.
CPC ............ *C22C 38/50* (2013.01); *B21D 22/022* (2013.01); *B32B 15/016* (2013.01); *C21D 7/13* (2013.01);
(Continued)

(58) Field of Classification Search
CPC ......... C22C 38/50; C22C 38/02; C22C 38/04; C22C 38/48; B21D 22/022; C21D 8/0226;
(Continued)

(56) References Cited

U.S. PATENT DOCUMENTS 8,066,829 B2 *  11/2011  Spehner ................... C21D 8/02
                                                               148/531
2009/0071575 A1     3/2009  Sun
(Continued)

FOREIGN PATENT DOCUMENTS

EP          2728032 A2      5/2014
EP          2995696 A1     11/2016
(Continued)

OTHER PUBLICATIONS

Bhcher et al. "Strength and Toughness of Hot Rolled Ferritr-Pearlite Steels." Fracture of Metals. Academic Press, 1969, 247-298. 1969.

*Primary Examiner* — Ricardo D Morales
(74) *Attorney, Agent, or Firm* — Davidson Kappel LLC

(57)          ABSTRACT

A method for manufacturing a hot-rolled and coated steel sheet having a thickness between 1.8 mm and 5 mm. The method contains the steps of: providing a semi-product having a composition containing: $0.04\% \le C \le 0.38\%$, $0.40\% \le Mn \le 3\%$, $0.005\% \le Si \le 0.70\%$, $0.005\% \le Al \le 0.1\%$, $0.001\% \le Cr \le 2\%$, $0.001\% \le Ni \le 2\%$, $0.001\% \le Ti \le 0.2\%$, $Nb \le 0.1\%$, $B \le 0.010\%$, $0.0005\% \le N \le 0.010\%$, $0.0001\% \le S \le 0.05\%$, $0.0001\% \le P \le 0.1\%$, $Mo \le 0.65\%$, $W \le 0.30\%$, $Ca \le 0.006\%$, hot-rolling with a final rolling temperature FRT, to obtain a hot-rolled steel product having a thickness between 1.8 mm and 5 mm, then cooling down to a coiling temperature $T_{coil}$ satisfying: $450°$ C. $\le T_{coil} \le T_{coilmax}$ with $T_{coilmax} = 650 - 140 \times f\gamma$, $T_{coilmax}$ being expressed in degrees Celsius and $f\gamma$ designating the austenite fraction just before the coiling, and coiling to obtain a hot-rolled steel substrate, (Continued)

pickling and coating the hot-rolled steel substrate with Al or an Al alloy by continuous hot-dipping in a bath, to obtain a hot-rolled and coated steel sheet containing a hot-rolled steel sheet and an Al or an Al alloy coating, having a thickness between 10 and 33 μm, on each side of the hot-rolled steel sheet.

29 Claims, 1 Drawing Sheet

(51) Int. Cl.

| | |
|---|---|
| *B32B 15/01* | (2006.01) |
| *C21D 7/13* | (2006.01) |
| *C21D 8/0221* | (2026.01) |
| *C21D 8/0278* | (2026.01) |
| *C22C 33/04* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/44* | (2006.01) |
| *C22C 38/48* | (2006.01) |
| *C22C 38/54* | (2006.01) |
| *C22C 38/58* | (2006.01) |
| *C23C 2/02* | (2006.01) |
| *C23C 2/12* | (2006.01) |
| *C23C 2/26* | (2006.01) |
| *C23C 2/28* | (2006.01) |
| *C23C 2/40* | (2006.01) |
| *C23C 28/02* | (2006.01) |

(52) U.S. Cl.
CPC ......... *C21D 8/0226* (2013.01); *C21D 8/0278* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/48* (2013.01); *C22C 38/54* (2013.01); *C22C 38/58* (2013.01); *C23C 2/02* (2013.01); *C23C 2/0224* (2022.08); *C23C 2/024* (2022.08); *C23C 2/12* (2013.01); *C23C 2/26* (2013.01); *C23C 2/28* (2013.01); *C23C 2/40* (2013.01); *C23C 28/025* (2013.01); *C21D 2211/001* (2013.01); *C21D 2211/005* (2013.01); *C21D 2211/009* (2013.01)

(58) Field of Classification Search
CPC ............ C21D 8/0278; C21D 2211/001; C21D 2211/005; C21D 2211/009; C23C 2/12; C23C 2/40
See application file for complete search history.

(56) References Cited

U.S. PATENT DOCUMENTS

| | | | |
|---|---|---|---|
| 2010/0026048 A1 | 2/2010 | Vlot | |
| 2012/0085467 A1* | 4/2012 | Thirion ................... C22C 38/04 | |
| | | | 148/531 |
| 2014/0030533 A1 | 1/2014 | Maki | |
| 2014/0030544 A1* | 1/2014 | Maki .................... C21D 8/0263 | |
| | | | 428/653 |
| 2014/0216612 A1 | 8/2014 | Laurent et al. | |
| 2015/0017471 A1 | 1/2015 | Shuto et al. | |
| 2015/0122377 A1* | 5/2015 | Bocharova .............. C22C 38/32 | |
| | | | 148/334 |
| 2017/0198374 A1 | 7/2017 | Allelly et al. | |
| 2017/0253941 A1 | 9/2017 | Cobo et al. | |
| 2017/0369964 A1* | 12/2017 | Fujii .................... C21D 8/0463 | |
| 2018/0119240 A1 | 5/2018 | Tanaka et al. | |

FOREIGN PATENT DOCUMENTS

| | | | | | |
|---|---|---|---|---|---|
| EP | 3279353 A1 | | 2/2018 | | |
| JP | 2003171752 A | * | 6/2003 | .............. | C23C 2/02 |
| JP | 200520477 A | | 8/2005 | | |
| JP | 2005205477 A | * | 8/2005 | | |
| JP | 201043323 | | 2/2010 | | |
| JP | 2010521584 A | | 6/2010 | | |
| JP | 2013122076 A | | 6/2013 | | |
| KR | 20140098841 | | 8/2014 | | |
| KR | 20160015388 | | 2/2016 | | |
| WO | WO2008053273 A1 | | 5/2008 | | |
| WO | WO2010085983 A1 | | 8/2010 | | |
| WO | WO2015181318 A1 | | 3/2015 | | |
| WO | WO2016016707 A1 | | 2/2016 | | |
| WO | WO2016079675 A1 | | 5/2016 | | |
| WO | WO2016152870 A1 | | 9/2016 | | |
| WO | WO2016157896 A1 | | 10/2016 | | |

* cited by examiner

HOT-ROLLED AND COATED STEEL SHEET FOR HOT-STAMPING, HOT-STAMPED COATED STEEL PART AND METHODS FOR MANUFACTURING THE SAME

TECHNICAL FIELD

The present disclosure provides a hot-rolled and coated steel sheet for hot-stamping, having a thickness comprised between 1.8 mm and 5 mm, with an excellent coating adhesion after hot-stamping, and a hot-stamped coated steel part, at least one portion of which has a thickness comprised between 1.8 mm and 5 mm, with an excellent coating adhesion. The present disclosure also provides a method for manufacturing a hot-rolled and coated steel sheet for hot-stamping having a thickness comprised between 1.8 mm and 5 mm, and a method for manufacturing a hot-stamped coated steel part.

BACKGROUND

As the use of high strength steels in automotive applications increases, there is a growing demand for steels having both an increased strength and a good formability. Growing demands for weight saving and safety requirement motivate intensive elaboration of new concepts of automotive steels that can achieve higher ductility and strength.

Thus, several families of steels offering various strength levels have been proposed. In recent years, the use of coated steels in hot-stamping processes for the shaping of parts has become important, especially in the automotive field.

The steel sheets from which these parts are produced by hot-stamping, having a thickness generally comprised between 0.7 and 2 mm, are obtained through hot-rolling and further cold-rolling.

Furthermore, there is an increasing need for steel sheets for hot-stamping having a thickness higher than 1.8 mm, and even higher than 3 mm, up to 5 mm. Such steel sheets are for example desired to produce chassis parts or suspension arms, which have been, until now, produced by cold pressing, or to produce parts obtained by hot-stamping tailor rolled blanks (TRB).

However, coated steel sheets for hot-stamping having a thickness higher than 3 mm cannot be produced by cold-rolling. Indeed, the existing cold-rolling lines are not adapted to produce such cold-rolled coated steel sheets. Moreover, producing cold-rolled coated steel sheets having a thickness comprised between 1.8 mm and 5 mm involves the use of a low cold-rolling reduction ratio, which is incompatible with the recrystallization which is needed in the annealing step after cold-rolling. Thus, cold-rolled coated steel sheets having a thickness comprised between 1.8 mm and 5 mm would have an insufficient flatness, resulting for example in misalignment defects during tailored welded blank production.

It has therefore been proposed to produce steel sheets with a high thickness by hot-rolling. For example, JP 2010-43323 discloses a process for manufacturing hot-rolled steel sheets for hot-stamping, having a thickness higher than 1.6 mm.

SUMMARY

The inventors have discovered that, when producing coated steel sheets by hot-rolling, the adhesion of the coating on the surface of the steel part further to hot-stamping is unsatisfactory, which leads to poor adhesion of the painting on the hot-stamped part. The adhesion of the painting is for example assessed through a wet painting adhesion test.

Furthermore, in some particular cases, the thickness of the coating, before and after hot-stamping, cannot be tightly controlled, so that the thickness of the coating obtained is not within the targeted thickness range. This targeted thickness range is generally comprised between 10 μm and 33 μm, for example the range 10-20 μm, the range 15-33 μm or the range 20-33 μm. This uncontrolled coating thickness leads to a poor weldability.

Moreover, as explained in further details herein below, the inventors have discovered that the coating adhesion can be improved under certain circumstances slowing down the pickling process, without however improving the control of the thickness of the coating. Rather, under these circumstances, the control of the thickness of the coating, and therefore the weldability, is even worsened, and line productivity is reduced.

Therefore, the present disclosure provides a hot-rolled and coated steel sheet having a thickness comprised between 1.8 mm and 5 mm and a method for manufacturing the same, allowing to achieve an improved coating adhesion after hot-stamping, whilst allowing the control of the thickness of the coating of the hot-rolled and coated steel sheet to the targeted range, especially in the range comprised between 10 and 33 μm.

The present disclosure also provides a hot-stamped coated steel part, at least one portion of which has a thickness comprised between 1.8 mm and 5 mm, having an improved coating adhesion, and a method for manufacturing the same. The present disclosure further provides a process that does not reduce productivity at the pickling line.

In certain embodiments, a method for manufacturing a hot-rolled and coated steel sheet having a thickness comprised between 1.8 mm and 5 mm comprises:

providing a steel semi-product having a composition comprising, by weight percent:

0.04%≤C≤0.38%,
0.40%≤Mn≤3%,
0.005%≤Si≤0.70%,
0.005%≤Al≤0.1%,
0.001%≤Cr≤2%,
0.001%≤Ni≤2%,
0.001%≤Ti≤0.2%,
Nb≤0.10%,
B≤0.010%,
0.0005%≤N≤0.010%,
0.0001%≤S≤0.05%,
0.0001%≤P≤0.1%,
Mo≤0.65%,
W≤0.30%,
Ca≤0.006%, the balance of the composition consisting of iron and unavoidable impurities resulting from the smelting, hot-rolling the semi-product with a final rolling temperature FRT, so as to obtain a hot-rolled steel product having a thickness comprised between 1.8 mm and 5 mm, then cooling the hot-rolled steel product down to a coiling temperature $T_{coil}$ and coiling the hot-rolled steel product at said coiling temperature $T_{coil}$ to obtain a hot-rolled steel substrate, the coiling temperature $T_{coil}$ satisfying:

$$450° \text{ C.} \leq T_{coil} \leq T_{coilmax},$$

wherein $T_{coilmax}$ is a maximal coiling temperature expressed as:

$$T_{coilmax} = 650 - 140 \times f_\gamma,$$

3

$T_{coilmax}$ being expressed in degrees Celsius and fγ designating the austenite fraction in the hot-rolled steel product just before the coiling, pickling the hot-rolled steel substrate, coating the hot-rolled steel substrate with Al or an Al alloy by continuous hot-dipping in a bath, to obtain a hot-rolled and coated steel sheet comprising a hot-rolled steel sheet and an Al or an Al alloy coating, having a thickness comprised between 10 and 33 μm, on each side of the hot-rolled steel sheet.

According to an embodiment, the Ni content is of at most 0.1%.

In this embodiment, the composition comprises, by weight percent:

0.04%≤C≤0.38%,
0.40%≤Mn≤3%,
0.005%≤Si≤0.70%,
0.005%≤Al≤0.1%,
0.001%≤Cr≤2%,
0.001%≤Ni≤0.1%,
0.001%≤Ti≤0.2%,
Nb≤0.1%,
B≤0.010%,
0.0005%≤N≤0.010%,
0.0001%≤S≤0.05%,
0.0001%≤P≤0.1%,
Mo≤0.65%,
W≤0.30%,
Ca≤0.006%,
the balance of the composition consisting of iron and unavoidable impurities resulting from the smelting.

Preferably, the composition comprises, by weight percent:

0.04%≤C≤0.38%,
0.5%≤Mn≤3%,
0.005%≤Si≤0.5%,
0.005%≤Al≤0.1%,
0.001%≤Cr≤1%,
0.001%≤Ni≤0.1%,
0.001%≤Ti≤0.2%,
Nb≤0.10%,
B≤0.010%,
0.0005%≤N≤0.010%,
0.0001%≤S≤0.05%,
0.0001%≤P≤0.1%,
Mo≤0.10%,
Ca≤0.006%,
the balance of the composition consisting of iron and unavoidable impurities resulting from the smelting, Preferably, the final rolling temperature FRT is comprised between 840° C. and 1000° C.

According to an embodiment, the composition is such that 0.075%≤C≤0.38%.

According to a particular embodiment, the steel has the following chemical composition, by weight percent:

0.040%≤C≤0.100%,
0.80%≤Mn≤2.0%,
0.005%≤Si≤0.30%,
0.010%≤Al≤0.070%,
0.001%≤Cr≤0.10%,
0.001%≤Ni≤0.10%,
0.03%≤Ti≤0.08%,
0.015%≤Nb≤0.1%,
0.0005%≤N≤0.009%,
0.0001%≤S≤0.005%,
0.0001%≤P≤0.030%,
Mo≤0.10%,
Ca≤0.006%,

4 the balance of the composition consisting of iron and unavoidable impurities resulting from the smelting.

According to another particular embodiment, the steel has the following chemical composition, by weight percent:

0.062%≤C≤0.095%,
1.4%≤Mn≤1.9%,
0.2%≤Si≤0.5%,
0.020%≤Al≤0.070%,
0.02%≤Cr≤0.1%,
wherein 1.5%≤(C+Mn+Si+Cr)≤2.7%,
3.4×N≤Ti≤8×N,
0.04%≤Nb≤0.06%,
wherein 0.044%≤(Nb+Ti)≤0.09%,
0.0005%≤B≤0.004%,
0.001%≤N≤0.009%,
0.0005%≤S≤0.003%,
0.001% P≤0.020%,
and optionally 0.0001%≤Ca≤0.006%,
the balance of the composition consisting of iron and unavoidable impurities resulting from the smelting.

According to another particular embodiment, the steel has the following chemical composition, by weight percent:

0.15%≤C≤0.38%,
0.5%≤Mn≤3%,
0.10%≤Si≤0.5%,
0.005%≤Al≤0.1%,
0.01%≤Cr≤1%,
0.001%≤Ti≤0.2%,
0.0005%≤B≤0.010%,
0.0005%≤N≤0.010%,
0.0001%≤S≤0.05%,
0.0001%≤P≤0.1%,
the balance of the composition consisting of iron and unavoidable impurities resulting from the smelting.

According to another particular embodiment, the steel has the following chemical composition, by weight percent:

0.24%≤C≤0.38%,
0.40%≤Mn≤3%,
0.10%≤Si≤0.70%,
0.015%≤Al≤0.070%,
0.001%≤Cr≤2%,
0.25%≤Ni≤2%,
0.015%≤Ti≤0.1%,
0%≤Nb≤0.06%,
0.0005%≤B≤0.0040%,
0.003%≤N≤0.010%,
0.0001%≤S≤0.005%,
0.0001%≤P≤0.025%,
the titanium and nitrogen contents satisfying the following relationship:

Ti/N>3.42, the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:

0.05%≤Mo≤0.65%,
0.001%≤W≤0.30%,
0.0005%≤Ca S 0.005%,
the balance of the composition consisting of iron and unavoidable impurities resulting from the smelting.

5

6

Preferably, after pickling and before coating, the surface percentage of voids in the surface region of the hot-rolled steel substrate is lower than 30%, the surface region being defined as the region extending from the upper point of the surface of the hot-rolled steel substrate to a depth, from this upper point, of 15 μm.

Preferably, the hot-rolled steel sheet has a depth of intergranular oxidation lower than 4 μm.

According to an embodiment, the bath contains, by weight percent, from 8% to 11% of silicon and from 2% to 4% of iron, the remainder being aluminum or aluminum alloy and impurities inherent to the processing.

According to another embodiment, the bath contains, by weight percent, from 0.1% to 10% of magnesium, from 0.1% to 20% of aluminum, the remainder being Zn or Zn-alloy, optional additional elements such as Si, Sb, Pb, Ti, Ca, Mn, Sn, La, Ce, Cr, Ni, Zr and/or Bi, and impurities inherent to the processing.

According to another embodiment, the bath contains, by weight percent, from 2.0% to 24.0% of zinc, from 7.1% to 12.0% of silicon, optionally from 1.1% to 8.0% of magnesium, and optionally additional elements chosen from Pb, Ni, Zr or Hf, the content of each additional element being inferior to 0.3%, the balance being aluminum and unavoidable impurities and residual elements, the ratio Al/Zn being above 2.9.

According to another embodiment, the bath contains, by weight percent, from 4.0% to 20.0% of zinc, from 1% to 3.5% of silicon, optionally from 1.0% to 4.0% of magnesium, and optionally additional elements chosen from Pb, Ni, Zr or Hf, the content of each additional element being inferior to 0.3%, the balance being aluminum and unavoidable impurities and residual elements, the ratio Zn/Si being comprised between 3.2 and 8.0.

According to another embodiment, the bath contains, by weight percent, from 2.0% to 24.0% of zinc, from 1.1% to 7.0% of silicon, optionally from 1.1% to 8.0% of magnesium when the amount of silicon is between 1.1 and 4.0%, and optionally additional elements chosen from Pb, Ni, Zr or Hf, the content of each additional element being inferior to 0.3%, the balance being aluminum and unavoidable impurities and residual elements, the ratio Al/Zn being above 2.9.

According to an embodiment, the method further comprises, after coating the hot-rolled steel sheet with Al or an Al alloy, a step of depositing a Zn coating on the Al or Al-alloy coating through cementation, through electrodeposition or through sonic jet vapor deposition, the Zn coating having a thickness lower than or equal to 1.1 μm.

Preferably, the pickling is performed in an HCl bath during a time comprised between 15 and 65 s.

In an embodiment, the hot-rolled steel sheet has a structure composed of ferrite and pearlite.

The present disclosure also relates to a method for manufacturing a hot-rolled and coated steel sheet having a thickness comprised between 1.8 mm and 5 mm, said method comprising:

providing a steel semi-product having a composition comprising, by weight percent:
either 0.24%≤C≤0.38% and 0.40%≤Mn≤3%
or 0.38%≤C≤0.43% and 0.05%≤Mn≤0.40%,
0.10%≤Si≤0.70%,
0.015%≤Al≤0.070%,
0.001%≤Cr≤2%,
0.25%≤Ni≤2%,
0.015%≤Ti≤0.1%,
0%≤Nb≤0.06%,
0.0005%≤B≤0.0040%, 0.003%≤N≤0.010%,
0.0001%≤S≤0.005%,
0.0001%≤P≤0.025%,
the titanium and nitrogen contents satisfying the following relationship:
Ti/N>3.42,
the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:
0.05%≤Mo≤0.65%,
0.001% W≤0.30%,
0.0005%≤Ca≤0.005%,
the balance of the composition consisting of iron and unavoidable impurities resulting from the smelting,
hot-rolling the steel semi-product with a final rolling temperature FRT comprised between 840° C. and 1000° C., so as to obtain a hot-rolled steel product having a thickness comprised between 1.8 mm and 5 mm, then
cooling the hot-rolled steel product down to a coiling temperature $T_{coil}$ and coiling the hot-rolled steel product at said coiling temperature $T_{coil}$ to obtain a hot-rolled steel substrate, the coiling temperature $T_{coil}$ satisfying:

$$450° C. \leq T_{coil} \leq 495° C.,$$

pickling the hot-rolled steel substrate,
coating the hot-rolled steel substrate with Al or an Al alloy by continuous hot-dipping in a bath, to obtain a hot-rolled and coated steel sheet comprising a hot-rolled steel sheet and an Al or an Al alloy coating having a thickness comprised between 10 and 33 μm on each side of the hot-rolled steel sheet.

Preferably, after pickling and before coating, the surface percentage of voids in the surface region of the hot-rolled steel substrate is lower than 30%, the surface region being defined as the region extending from the upper point of the surface of the hot-rolled steel substrate to a depth, from this upper point, of 15 μm.

Preferably, the hot-rolled steel sheet has a depth of intergranular oxidation lower than 4 μm.

In an embodiment, the hot-rolled steel sheet has a structure composed of ferrite and pearlite.

The present disclosure also relates to a hot-rolled and coated steel sheet, comprising:

a hot-rolled steel sheet having a thickness comprised between 1.8 mm and 5 mm, the composition of which comprises, by weight percent:
0.04%≤C≤0.38%
0.40%≤Mn≤3%
0.005%≤Si≤0.70%
0.005%≤Al≤0.1%
0.001%≤Cr≤2%
0.001%≤Ni≤2%
0.001%≤Ti≤0.2%
Nb≤0.1%
B≤0.010%
0.0005%≤N≤0.010%
0.0001%≤S≤0.05%
0.0001%≤P≤0.1%
Mo≤0.65%

W≤0.30%

Ca≤0.006%, the balance of the composition consisting of iron and unavoidable impurities resulting from the smelting, said hot-rolled steel sheet having a depth of intergranular oxidation of less than 4 μm, an Al or an Al alloy coating, having a thickness comprised between 10 and 33 μm, on each side of the hot-rolled steel sheet.

According to an embodiment, the composition is such that Ni≤0.1%.

In this embodiment, the composition preferably comprises, by weight percent:

0.04%≤C≤0.38%, 0.5%≤Mn≤3%, 0.005%≤Si≤0.5%, 0.005%≤Al≤0.1%, 0.001%≤Cr≤1%, 0.001%≤Ni≤0.1%, 0.001%≤Ti≤0.2%,

Nb≤0.10%,

B≤0.010%, 0.0005%≤N≤0.010%, 0.0001%≤S≤0.05%, 0.0001%≤P≤0.1%,

Mo≤0.10%,

Ca≤0.006%, the balance of the composition consisting of iron and unavoidable impurities resulting from the smelting, According to an embodiment, the composition is such that 0.075%≤C≤0.38%.

According to a particular embodiment, the steel has the following chemical composition, by weight percent:

0.040%≤C≤0.100%, 0.80%≤Mn≤2.0%, 0.005%≤Si≤0.30%, 0.010%≤Al≤0.070%, 0.001%≤Cr≤0.10%, 0.001%≤Ni≤0.10%, 0.03%≤Ti≤0.08%, 0.015%≤Nb≤0.1%, 0.0005%≤N≤0.009%, 0.0001%≤S≤0.005%, 0.0001%≤P≤0.030%,

Mo≤0.10%,

Ca≤0.006%, the balance of the composition consisting of iron and unavoidable impurities resulting from the smelting.

According to another particular embodiment, the steel has the following chemical composition, by weight percent:

0.062%≤C≤0.095%, 1.4%≤Mn≤1.9%, 0.2%≤Si≤0.5%, 0.020%≤Al≤0.070%, 0.02%≤Cr≤0.1%, wherein 1.5%≤(C+Mn+Si+Cr)≤2.7%, 3.4×N≤Ti≤8×N, 0.04%≤Nb≤0.06%, wherein 0.044%≤(Nb+Ti)≤0.09%, 0.0005%≤B≤0.004%, 0.001%≤N≤0.009%, 0.0005%≤S≤0.003%, 0.001% P≤0.020%, and optionally 0.0001%≤Ca≤0.006%, the balance of the composition consisting of iron and unavoidable impurities resulting from the smelting.

According to another particular embodiment, the steel has the following chemical composition, by weight percent:

0.15%≤C≤0.38%, 0.5%≤Mn≤3%, 0.10%≤Si≤0.5%, 0.005%≤Al≤0.1%, 0.01%≤Cr≤1%, 0.001%≤Ti≤0.2%, 0.0005%≤B≤0.010%, 0.0005%≤N≤0.010%, 0.0001%≤S≤0.05%, 0.0001%≤P≤0.1%, the balance of the composition consisting of iron and unavoidable impurities resulting from the smelting.

According to another particular embodiment, the steel has the following chemical composition, by weight percent:

0.24%≤C≤0.38%, 0.40%≤Mn≤3%, 0.10%≤Si≤0.70%, 0.015%≤Al≤0.070%, 0.001%≤Cr≤2%, 0.25%≤Ni≤2%, 0.015%≤Ti≤0.1%,

0%≤Nb≤0.06%, 0.0005%≤B≤0.0040%, 0.003%≤N≤0.010%, 0.0001%≤S≤0.005%, 0.0001%≤P≤0.025%, the titanium and nitrogen contents satisfying the following relationship:

Ti/N>3.42, the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:

0.05%≤Mo≤0.65%, 0.001%≤W≤0.30%, 0.0005%≤Ca≤0.005%, the balance of the composition consisting of iron and unavoidable impurities resulting from the smelting.

Preferably, the coating comprises an intermetallic layer having a thickness of at most m, i.e. of less than or equal to 15 μm.

According to an embodiment, the hot-rolled and coated steel sheet further comprises, on each side, a Zn coating having a thickness lower than or equal to 1.1 μm.

In an embodiment, the hot-rolled steel sheet has a ferrito-pearlitic structure, i.e. a structure consisting of ferrite and pearlite.

The present disclosure also relates to a hot-rolled and coated steel sheet comprising:

(i) a hot-rolled steel sheet having a thickness comprised between 1.8 mm and 5 mm, the composition of which comprises, by weight percent:

either 0.24%≤C≤0.38% and 0.40%≤Mn≤3% or 0.38%≤C≤0.43% and 0.05%≤Mn≤0.40%, 0.10%≤Si≤0.70%, 0.015%≤Al≤0.070%, 0.001%≤Cr≤2%, 0.25%≤Ni≤2%, 0.015%≤Ti≤0.1%, 0%≤Nb≤0.06%,
0.0005%≤B≤0.0040%,
0.003%≤N≤0.010%,
0.0001%≤S≤0.005%,
0.0001%≤P≤0.025%,
the titanium and nitrogen contents satisfying the following relationship:
Ti/N>3.42,
the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:
0.05%≤Mo≤0.65%,
0.001%≤W≤0.30%,
0.0005%≤Ca≤0.005%,
the balance of the composition consisting of iron and unavoidable impurities resulting from the smelting,
said hot-rolled steel sheet having a depth of intergranular oxidation of less than 4 μm,
(ii) an Al or an Al alloy coating, having a thickness comprised between 10 and 33 μm, on each side of the hot-rolled steel sheet.

Preferably, the coating comprises an intermetallic layer having a thickness of at most m, i.e. of less than or equal to 15 μm.

According to an embodiment, the hot-rolled and coated steel sheet further comprises, on each side, a Zn coating having a thickness lower than or equal to 1.1 μm.

In an embodiment, the hot-rolled steel has a ferrito-pearlitic structure, i.e. a structure consisting of ferrite and pearlite.

The present disclosure also relates to a method for manufacturing a hot-stamped coated steel part, comprising the steps of
providing a hot-rolled and coated steel sheet according to the present disclosure or produced by a method according to the present disclosure,
cutting the hot-rolled and coated steel sheet to obtain a blank,
heating the blank in a furnace to a temperature Tc to obtain a heated blank,
transferring the heated blank to a die and hot-stamping the heated blank in the die, to thereby obtain a hot-stamped blank,
cooling the hot-stamped blank to a temperature less than 400° C. to obtain a hot-stamped coated steel part.

According to an embodiment, after the cutting of the hot-rolled and coated steel sheet to obtain the blank and before the blank is heated to the temperature Tc, the blank is welded to another blank made of a steel having a composition comprising, by weight percent:
0.04%≤C≤0.38%,
0.40%≤Mn≤3%,
0.005%≤Si≤0.70%,
0.005%≤Al≤0.1%,
0.001%≤Cr≤2%,
0.001%≤Ni≤2%,
0.001%≤Ti≤0.2%,
Nb≤0.10%,
B≤0.010%,
0.0005%≤N≤0.010%, 0.0001%≤S≤0.05%,
0.0001%≤P≤0.1%,
Mo≤0.65%,
W≤0.30%,
Ca≤0.006%,
the balance of the composition consisting of iron and unavoidable impurities resulting from the smelting.

Preferably, said other blank has a composition such that Ni≤0.1%.

According to another embodiment, after the cutting of the hot-rolled and coated steel sheet to obtain the blank and before the blank is heated to the temperature Tc, the blank is welded to another blank made of a steel having a composition comprising, by weight percent:
either 0.24%≤C≤0.38% and 0.40%≤Mn≤3%
or 0.38%≤C≤0.43% and 0.05%≤Mn≤0.40%,
0.10%≤Si≤0.70%,
0.015%≤Al≤0.070%,
0.001%≤Cr≤2%,
0.25%≤Ni≤2%,
0.015%≤Ti≤0.1%,
0%≤Nb≤0.06%,
0.0005%≤B≤0.0040%,
0.003%≤N≤0.010%,
0.0001%≤S≤0.005%,
0.0001%≤P≤0.025%,
the titanium and nitrogen contents satisfying the following relationship:
Ti/N>3.42,
the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:
0.05%≤Mo≤0.65%
0.001%≤W≤0.30%
0.0005%≤Ca≤0.005%,
the balance of the composition consisting of iron and unavoidable impurities resulting from the smelting.

The present disclosure also relates to a hot-stamped coated steel part, comprising at least one portion having a thickness comprised between 1.8 mm and 5 mm, said hot-stamped coated steel part comprising an Al or Al-alloy coating, the coating having a surface percentage of porosities of less than or equal to 3%.

According to an embodiment, said portion is made of a steel having a composition comprising, by weight percent:
0.04%≤C≤0.38%,
0.40%≤Mn≤3%,
0.005%≤Si≤0.70%,
0.005%≤Al≤0.1%,
0.001%≤Cr≤2%,
0.001%≤Ni≤2%,
0.001%≤Ti≤0.2%,
Nb≤0.10%,
B≤0.010%,
0.0005%≤N≤0.010%,
0.0001%≤S≤0.05%,
0.0001%≤P≤0.1%,
Mo≤0.65%,
W≤0.30%,
Ca≤0.006%, the balance of the composition consisting of iron and unavoidable impurities resulting from the smelting.

According to an embodiment, the composition of the steel in said portion is such that Ni≤0.1%.

According to another embodiment, said portion is made of a steel having a composition comprising, by weight percent:

either 0.24%≤C≤0.38% and 0.40%≤Mn≤3%
or 0.38%≤C≤0.43% and 0.05%≤Mn≤0.40%,
0.10%≤Si≤0.70%,
0.015%≤Al≤0.070%,
0.001%≤Cr≤2%,
0.25%≤Ni≤2%,
0.015%≤Ti≤0.1%,
0%≤Nb≤0.06%,
0.0005%≤B≤0.0040%,
0.003%≤N≤0.010%,
0.0001%≤S≤0.005%,
0.0001%≤P≤0.025%, the titanium and nitrogen contents satisfying the following relationship:

Ti/N>3.42, the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:

0.05%≤Mo≤0.65%,
0.001%≤W≤0.30%,
0.0005%≤Ca≤0.005%, the balance of the composition consisting of iron and unavoidable impurities resulting from the smelting.

The present disclosure also relates to the use of a hot-stamped coated steel part according to the present disclosure or produced by a method according to the present disclosure for the manufacture of chassis or body-in-white parts or suspension arms for automobile vehicles.

BRIEF DESCRIPTION OF THE DRAWINGS

The present disclosure will now be described in details and illustrated by examples without introducing limitations, with reference to the appended figures among which.

DETAILED DESCRIPTION

Figure 1:
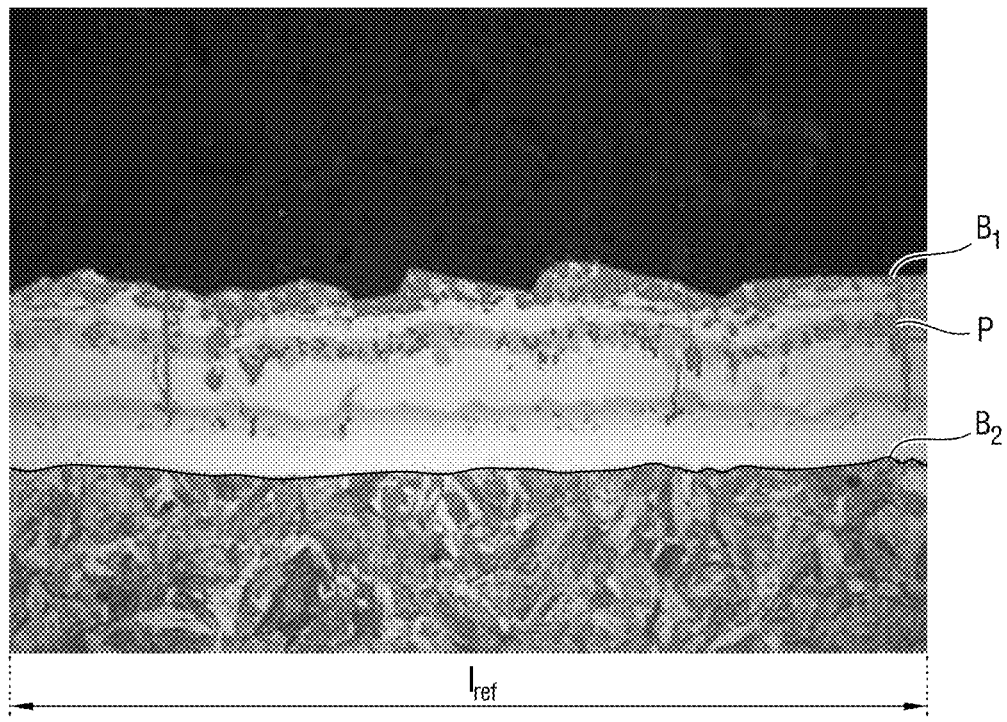
FIG. 1 is a cross-section of a hot-rolled coated steel part, illustrating the assessment of the coating adhesion after hot-stamping.

By hot-rolled steel product, substrate, sheet or part, it must be understood that the product, substrate, sheet or part is hot-rolled but not cold-rolled.

The present disclosure refers to a hot-rolled steel sheet which has not been further cold-rolled.

Hot-rolled sheets or substrates differ from cold-rolled sheets or substrates with respect to the following features: in general, the hot and cold-rolling steps create some damage around the second-phase particles due to the differences in rheological behavior between the matrix and the second phase particles (oxides, sulfides, nitrides, carbides . . . ). In the case of cold-rolling, voids can nucleate and grow around cementite, carbides or pearlite. Furthermore, the particles can be fragmented. This damage can be observed on sheets which are cut and prepared by Ion Beam Polishing. This technique avoids artifacts due to the metal flow in mechanical polishing which can fill partly or totally the eventual voids. Further observation of the presence of eventual voids is performed through Scanning Electron Microscopy. As compared to a hot-rolled steel sheet rolled in the austenitic range, the local damage observed around or within cementite particles can be specifically attributed to cold rolling since these particles are not present at the hot rolling step. Thus, the damage observed within or around cementite, carbides or pearlite, in a rolled steel sheet, is an indication that the steel sheet has been cold-rolled.

Besides, in the following, a hot-rolled steel substrate will designate the hot-rolled steel product which is produced when performing the manufacturing method before any coating step, and a hot-rolled and coated steel sheet will designate the product resulting from the manufacturing method, including the coating step. The hot-rolled and coated steel sheet therefore results from the coating of the hot-rolled steel substrate, and comprises a steel product and a coating on each side of the steel product.

To distinguish the steel product of the hot-rolled and coated steel sheet (i.e. excluding the coating) from the hot-rolled steel substrate prior to the coating, the steel product of the hot-rolled and coated steel sheet will be designated hereinafter by "hot-rolled steel sheet".

Hot-rolled steel substrates are generally produced from a steel semi-product which is heated, hot-rolled to the targeted thickness, cooled to a coiling temperature Tcoil, coiled at the coiling temperature Tcoil, and pickled so as to eliminate the scale.

The hot-rolled steel substrates may then be coated to create hot-rolled and coated steel sheets, which are destined to be cut, heated in a furnace, hot-stamped and cooled to the room temperature to obtain the desired structure.

The inventors have investigated the problem of lack of adhesion of the coating further to hot-stamping, and discovered that this lack of adhesion mostly occurs at parts of the sheets that were located in the core and longitudinal axis region of the coil during the coiling.

The inventors have further investigated this phenomenon and discovered that the lack of adhesion of the coating after hot stamping is caused by intergranular oxidation occurring during the coiling.

Especially, just before the coiling, the steel comprises austenite. After coiling, part of this austenite transforms into ferrite and pearlite, generating heat. The heat which is generated leads to an increase in temperature in the coiled steel substrate, especially in the core and axis region of the coil.

The core of the coil is defined as the portion of the substrate (or sheet) which extends, along the longitudinal direction of the substrate, from a first end located at 30% of the overall length of the substrate, to a second end located at 70% of the overall length of the substrate. Besides, the axis region is defined as the region centered on the longitudinal middle axis of the substrate, having a width equal to 60% of the overall width of the substrate.

In the core and axis region, during the coiling, the windings are contiguous, and the partial pressure in oxygen is such that only the elements more easily oxidized than iron, especially silicon, manganese or chrome, are oxidized.

The iron-oxygen phase diagram at 1 atmosphere shows that the iron oxide which is formed at high temperatures, namely wustite (FeO), is not stable at temperatures lower than 570° C., and transforms, at the thermodynamic equilibrium, into two other phases: hematite (Fe2O3) and magnetite (Fe3O4). Conversely, if the increase in temperature at some parts of the coil during the coiling, especially in the core and axis region of the coil, is such that the temperature exceeds 570° C., hematite and magnetite transform into wustite, one of the products of this decomposition being oxygen.

The oxygen resulting from this reaction combines with elements more easily oxidized than iron, especially silicon, manganese, chrome and aluminum, which are present at the surface of the steel substrate.

These oxides naturally form at the grain boundaries, rather than diffusing homogeneously in the matrix. As a result, the oxidation is more pronounced at the grain boundaries. This oxidation will be referred to herein after as intergranular oxidation.

Thus, at the end of the coiling, the coil comprises intergranular oxidation, at the surface and down to a certain depth, which can be as high as 17 micrometers.

The inventors have discovered that an important intergranular oxidation in the hot-rolled steel substrate, and consequently in the hot-rolled steel sheet, results in a poor adhesion of the coating after hot-stamping. Indeed, after coating, when the sheet heated to be hot-stamped, carbon diffuses towards the coating and meets the intergranular oxides, in particular manganese and silicon oxides. This diffusion of carbon results in a reaction between $SiO_2$ and C, between MnO and C, and between $Mn_2SiO_4$ and C, to form carbon oxides. These carbon oxides migrate and are dissolved until final coating solidification, when they gather to form pockets, resulting in porosities in the coating, and thus to a poor coating adhesion.

The impact of the intergranular oxidation on the coating adhesion is specific to hot-rolled steel sheets, which are not subjected to cold-rolling further to the coiling, by contrast with cold-rolled steel sheets. Indeed, during the production of such cold-rolled sheets, the intergranular oxidation that may be present at the surface of the substrate, prior to cold-rolling, is subjected during the cold-rolling, as the whole sheet, to a thickness reduction. Consequently, the depth of intergranular oxidation of the cold-rolled sheet, before hot-stamping, is reduced to a large extent in comparison with the depth of intergranular oxidation of a hot-rolled steel sheet.

The intergranular oxidation can be reduced or even removed, prior to coating, by intensively pickling the steel substrate, for example in an HCl bath during a time of 375 s.

However, intensive pickling requires a very low line speed, which is not compatible with industrial processing.

Furthermore, this intensive pickling results in a very important developed surface, at the surface of the steel substrate. The developed surface designates the total area of the surface of the steel substrate, which is in contact with the bath during the coating.

This important developed surface results in a more intense iron dissolution from steel surface during the hot-dip coating in the bath, resulting in a growth of the intermetallic layer, which is finally not limited to a single limited region of the coating adjacent to the steel sheet, but reaches the surface of the coating. As a consequence, the thickness of the coating cannot be controlled in the targeted thickness range. The intermetallic layer is made of a solid-state compound composed from metallic elements with a defined stoichiometry, having a crystal structure wherein the atoms occupy specific positions.

The inventors have therefore found that suppressing or limiting the intergranular oxidation during the coiling allows manufacturing a hot-rolled and coated steel sheet with a thickness comprised between 1.8 mm and 5 mm having an improved coating adhesion after hot-stamping whilst allowing the control of the thickness of the coating to the targeted range, especially between 10 and 33 μm, and whilst keeping good productivity at industrial pickling line.

The composition of the steel is such that the steel can be hot-stamped to create a part having a tensile strength higher than or equal to 500 MPa, or higher than or equal to 1000 MPa, or higher than or equal to 1350 MPa, or higher than or equal to 1680 MPa.

A composition of the steel according to a first aspect of the present disclosure is disclosed herebelow.

As regards the chemical composition of the steel, carbon plays an important role in the hardenability and the tensile strength obtained after hot-stamping, thanks to its effect on the hardness of the martensite.

Below a content of 0.04%, it is not possible to obtain a tensile strength above 500 MPa after stamping under any cooling conditions. Above 0.38%, in combination with the other elements of the composition according to this first aspect, the adhesion of the coating after hot stamping is not satisfactory. Without being bound by a theory, a C content higher than 0.38% may result in an important formation of carbon oxides during the heating of the sheet prior to hot-stamping, aggravating the negative impact of the intergranular oxidation on the coating adhesion. Furthermore, above 0.38%, the resistance to delayed cracking and the toughness of the steel decrease.

The C content depends on the desired tensile strength TS of the hot-stamped part, produced by hot-stamping the steel sheet. Especially, for carbon contents ranging from 0.06% to 0.38% by weight, the tensile strength TS of hot-stamped parts produced through total austenitization and stamping, followed by a martensitic quenching, depends practically only on the carbon content and is linked to the carbon content by the expression:

$$TS(\text{MPa})=3220(\text{C}\%)+908,$$

wherein C % designates the carbon content, by weight percent.

According to an embodiment, the C content is higher than or equal to 0.75%.

Apart from its deoxidizing role, manganese has an important effect on quenchability, in particular when its content is of at least 0.40%, the C content being of at most 0.38%. Above 3%, the stabilization of austenite by Mn is too important, which leads to the formation of a too pronounced banded structure. According to an embodiment, the Mn content is lower than or equal to 2.0%.

Silicon is added in a content of at least 0.005% to help deoxidizing the liquid steel and to contribute to the hardening of the steel. Its content must however be limited in order to avoid excess formation of silicon oxides. Besides, the silicon content must be limited to avoid a too important stabilization of austenite. The silicon content is therefore lower than or equal to 0.70%, for example lower than or equal to 0.5%. Preferably, the Si content is of at least 0.10%.

Aluminum may be added as a deoxidizer, the Al content being lower than or equal to 0.1%, and higher than 0.005%, generally higher than or equal to 0.010%. Preferably, the Al content is lower than or equal to 0.070%.

Optionally, the steel composition comprises chromium, tungsten and/or boron, to increase the quenchability of the steel.

Especially, Cr may be added to increase the quenchability of the steel and contributes to achieving the desired tensile strength TS after hot-stamping. When Cr is added, its content is higher than or equal to 0.01%, up to 2%. If no voluntary addition of Cr is performed, the Cr content may be as low as 0.001%.

W may be added to increase the quenchability and the hardenability of the steel by forming tungsten carbides. When W is added, its content is higher than or equal to 0.001%, and lower than or equal to 0.30%.

When B is added, its content is higher than 0.0002%, and preferably higher than or equal to 0.0005%, up to 0.010%. The B content is preferably lower than or equal to 0.005%.

Up to 0.1% of niobium and/or up to 0.2% of titanium are optionally added to provide precipitation hardening.

When Nb is added, its content is preferably of at least 0.01%. In particular, when the Nb content is comprised between 0.01% and 0.1%, fine hardening carbonitrides Nb(CN) precipitates form in the austenite or in the ferrite during hot-rolling. The Nb content is preferably lower than or equal to 0.06%. Still preferably, the Nb content is comprised between 0.03% and 0.05%.

When Ti is added, its content is preferably of at least 0.015%, up to 0.2%. When the Ti content is comprised between 0.015% and 0.2%, precipitation at very high temperature occurs in the form of TiN and then, at lower temperature, in the austenite in the form of fine TiC, resulting in hardening. Furthermore, when titanium is added in addition to boron, titanium prevents combination of boron with nitrogen, the nitrogen being combined with titanium. Hence, the titanium content is preferably higher than 3.42N. However, the Ti content should remain lower than or equal to 0.2%, preferably lower than or equal to 0.1%, to avoid precipitation of coarse TiN precipitates. If no voluntary addition of Ti is performed, Ti is present as an impurity in a content of at least 0.001%.

Molybdenum may be added in a content of at most 0.65%. When Mo is added, its content is preferably of at least 0.05%, for example lower than or equal to 0.10%. Mo is preferably added together with Nb and Ti, to form co-precipitates which are very stable at high temperatures, and limit the austenitic grain growth upon heating. An optimal effect is obtained when the Mo content is comprised between 0.15% and 0.25%.

Nickel is present as an impurity in a content which may be as low as 0.001%, and lower or equal than 0.1%.

Sulfur, phosphorus and nitrogen and generally present in the steel composition as impurities.

The nitrogen content is of at least 0.0005%. The nitrogen content must be at most 0.010%, so as to prevent precipitation of coarse TiN precipitates.

When in excessive amounts, sulfur and phosphorus reduce the ductility. Therefore, their contents are limited to 0.05% and 0.1% respectively.

Preferably, the S content is of at most 0.03%. Achieving a very low S content, i.e. lower than 0.0001%, is very costly, and without any benefit. Therefore, the S content is generally higher than or equal to 0.00010%.

Preferably, the phosphorus content is of at most 0.05%, still preferably of at most 0.025%. Achieving a very low P content, i.e. lower than 0.0001%, is very costly. Therefore, the P content is generally higher than or equal to 0.00010%.

The steel may undergo a treatment for globularization of sulfides performed with calcium, which has the effect of improving the bending angle, due to MnS globularization. Hence, the steel composition may comprise at least 0.0001% of Ca, up to 0.006%.

The balance of the composition of the steel consists of iron and unavoidable impurities resulting from the smelting.

According to a first embodiment, the steel has the following chemical composition, by weight percent:
$0.040\% \le C \le 0.100\%$,
$0.80\% \le Mn \le 2.0\%$,
$0.005\% \le Si \le 0.30\%$,
$0.010\% \le Al \le 0.070\%$,
$0.001\% \le Cr \le 0.10\%$,
$0.001\% \le Ni \le 0.10\%$,
$0.03\% \le Ti \le 0.08\%$,
$0.015\% \le Nb \le 0.11\%$,
$0.0005\% \le N \le 0.009\%$,
$0.0001\% \le S \le 0.005\%$,
$0.0001\% \le P \le 0.030\%$,
$Mo \le 0.10\%$,
$Ca \le 0.006\%$,
the balance of the composition consisting of iron and unavoidable impurities resulting from the smelting.

With this composition, steel parts having, after hot-stamping, a tensile strength of at least 500 MPa, can be produced.

According to a second embodiment, the steel has the following chemical composition, by weight percent:
$0.062\% \le C \le 0.095\%$,
$1.4\% \le Mn \le 1.9\%$,
$0.2\% \le Si \le 0.5\%$,
$0.020\% \le Al \le 0.070\%$,
$0.02\% \le Cr \le 0.1\%$,
wherein $1.5\% \le (C+Mn+Si+Cr) \le 2.7\%$,
$3.4 \times N \le Ti \le 8 \times N$,
$0.04\% \le Nb \le 0.06\%$,
wherein $0.044\% \le (Nb+Ti) \le 0.09\%$,
$0.0005\% \le B \le 0.004\%$,
$0.001\% \le N \le 0.009\%$,
$0.0001\% \le S \le 0.003\%$,
$0.0001\% \le P \le 0.020\%$,
and optionally $0.0001\% \le Ca \le 0.006\%$,
the balance of the composition consisting of iron and unavoidable impurities resulting from the smelting.

With this composition, steel parts having, after hot-stamping, a tensile strength of at least 1000 MPa, can be produced.

According to a third embodiment, the steel has the following chemical composition, by weight percent:
$0.15\% \le C \le 0.38\%$,
$0.5\% \le Mn \le 3\%$,
$0.10\% \le Si \le 0.5\%$,
$0.005\% \le Al \le 0.1\%$,
$0.01\% \le Cr \le 1\%$,
$0.001\% \le Ti \le 0.2\%$,
$0.0005\% \le B \le 0.08\%$,
$0.0005\% \le N \le 0.010\%$,
$0.0001\% \le S \le 0.05\%$,
$0.0001\% \le P \le 0.1\%$,
the balance of the composition consisting of iron and unavoidable impurities resulting from the smelting.

With this composition, steel parts having, after hot-stamping, a tensile strength of at least 1350 MPa, can be produced.

A composition of the steel according to a second aspect of the present disclosure is disclosed herebelow.

The C content is comprised between 0.24% and 0.38% if the Mn content is comprised between 0.40% and 3%. Carbon plays an important role in the hardenability and the tensile strength obtained after hot-stamping, thanks to its effect on the hardness of the martensite. A content of at least 0.24% allows achieving a tensile strength TS of at least 1800 MPa after hot stamping, without adding costly elements. Above 0.38%, when the Mn content is comprised between 0.40% and 3%, the resistance to delayed cracking and the toughness of the steel decrease. The C content is preferably comprised between 0.32% and 0.36% if the Mn content is comprised between 0.40% and 3%.

An increased C content comprised between 0.38% and 0.43% can be used when the Mn content is lowered to the range comprised between 0.05% and 0.40%. The lowering of the Mn content is thus compensated for by the increase in the C content whilst achieving an improved corrosion resistance under strain.

Apart from its deoxidizing role, manganese has an important effect on quenchability.

When the C content is comprised between 0.24% and 0.38%, the Mn content must be of at least 0.40% and lower than or equal to 3%. A Mn content of at least 0.40% is necessary to achieve a Ms temperature, being the temperature of start of transformation of austenite to martensite upon cooling low enough to achieve the desired strength level (tensile strength TS of at least 1800 MPA in this embodiment).

Above 3%, the stabilization of austenite by Mn is too important, which leads to the formation of a too pronounced banded structure. The Mn content is preferably lower than or equal to 2.0%.

In the alternative, the Mn content can be lowered to the range comprised between 0.05% and 0.40% if the C content is increased to the range comprised between 0.38% and 0.43%. Lowering the Mn content allows achieving a higher corrosion resistance under strain.

The Mn and C content are preferably defined together with the Cr content.

When the C content is comprised between 0.32% and 0.36%, an Mn content comprised between 0.40% and 0.80% and a Cr content comprised between 0.05% and 1.20% allow achieving a high resistance to delayed cracking.

When the C content is comprised between 0.24% and 0.38%, the Mn content being comprised between 1.50% and 3%, the spot weldability is particularly satisfactory.

When the C content is comprised between 0.38% and 0.43%, the Mn content being comprised between 0.05% and 0.40%, and preferably between 0.09% and 0.11%, the corrosion resistance under strain is highly increased.

These composition ranges allow reaching a Ms temperature comprised between about 320° C. and 370° C., which guarantees a very high strength of the hot stamped parts.

Silicon is added in a content comprised between 0.10% and 0.70% by weight. A content of at least 0.10% provides an additional hardening and helps deoxidizing the liquid steel. Its content must however be limited in order to avoid excess formation of silicon oxides. Besides, the silicon content must be limited to avoid a too important stabilization of austenite. The silicon content is therefore lower than or equal to 0.70%.

When the C content is comprised between 0.24% and 0.38%, the Si content is preferably of at least 0.50% in order to avoid a tempering of the fresh martensite which may occur as the steel is maintained within the die after the martensitic transformation.

Aluminum may be added as a deoxidizer, the Al content being lower than or equal to 0.070%, and higher than or equal to 0.015%. Above 0.070%, coarse aluminates may be created during the elaboration, reducing the ductility. Preferably, the Al content is lower comprised between 0.020% and 0.060%.

Optionally, the steel composition comprises chromium and/or tungsten to increase the quenchability of the steel.

Chromium increases the quenchability of the steel and contributes to achieving the desired tensile strength TS after hot-stamping. When Cr is added, its content is higher than or equal to 0.01%, up to 2%. If no voluntary addition of Cr is performed, the Cr content may be as low as 0.001%.

When the C content is comprised between 0.24% and 0.38%, the Cr content is preferably comprised between 0.30% and 0.50%. When the Mn content is comprised between 1.50% and 3%, the Cr addition is optional, the quenchability achieved through Mn addition being sufficient.

When the C content is comprised between 0.38% and 0.43%, a Cr content higher than 0.5%, and preferably comprised between 0.950% and 1.050%, is preferred, in order to increase the corrosion resistance under strain.

In addition to the above defined conditions, the C, Mn, Cr and Si contents must satisfy the following condition:

$$2.6C + \frac{Mn}{5.3} + \frac{Cr}{13} + \frac{Si}{15} \geq 1.1\%$$

Under this condition, the fraction of self-tempered martensite resulting from the tempering of the martensite that may occur as the part is maintained in the die is very limited, so that the very high fresh martensite fraction allows achieving a tensile strength of at least 1800 MPa.

W may be added to increase the quenchability and the hardenability of the steel by forming tungsten carbides. When W is added, its content is higher than or equal to 0.001%, and lower than or equal to 0.30%.

B is added in a content higher than 0.0005%, up to 0.0040%. B increases the quenchability. By diffusing at the grain boundaries, B prevents the intergranular segregation of P.

Up to 0.06% of niobium and/or up to 0.1% of titanium are optionally added to provide precipitation hardening.

When Nb is added, its content is preferably of at least 0.01%. In particular, when the Nb content is comprised between 0.01% and 0.06%, fine hardening carbonitrides Nb(CN) precipitates form in the austenite or in the ferrite during hot-rolling. Nb thus limits the growth of the austenitic grains during the heating before stamping. The Nb content is however lower than or equal to 0.06%. Indeed, above 0.06%, the rolling load may become too high. Preferably, the Nb content is comprised between 0.03% and 0.05%.

Ti is added in a content of at least 0.015%, up to 0.1%. When the Ti content is comprised between 0.015% and 0.1%, precipitation at very high temperature occurs in the form of TiN and then, at lower temperature, in the austenite in the form of fine TiC, resulting in hardening. Furthermore, titanium prevents combination of boron with nitrogen, the nitrogen being combined with titanium. Hence, the titanium content is higher than 3.42N. However, the Ti content should remain lower than or equal to 0.1%, to avoid precipitation of coarse TiN precipitates. Preferably, the Ti content is comprised between 0.020% and 0.040% in order to create fine nitrides which limit the growth of the austenitic grains during the heating before stamping.

Molybdenum may be added in a content of at most 0.65%. When Mo is added, its content is preferably of at least 0.05%. Mo is preferably added together with Nb and Ti, to form co-precipitates which are very stable at high temperatures, and limit the austenitic grain growth upon heating. An optimal effect is obtained when the Mo content is comprised between 0.15% and 0.25%.

Nickel is added to increase the resistance to delayed fracture of the steel, in a content comprised between 0.25% and 2%.

The nitrogen content is of at least 0.003% to achieve a precipitation of TiN, Nb(CN) and/or (Ti,Nb)(CN), limiting the growth of the austenitic grains, as explained above. The nitrogen content must be at most 0.010%, so as to prevent precipitation of coarse TiN precipitates.

When in excessive amounts, sulfur and phosphorus reduce the ductility. Therefore, their contents are limited to 0.005% and 0.025% respectively.

The S content is of at most 0.005% to limit the precipitation of sulfides. Achieving a very low S content, i.e. lower than 0.0001%, is very costly, and without any benefit. Therefore, the S content is generally higher than or equal to 0.0001%.

The phosphorus content is of at most 0.025%, so limit the segregation of P at the austenitic grain boundaries. Achieving a very low P content, i.e. lower than 0.0001%, is very costly. Therefore, the P content is generally higher than or equal to 0.0001%.

The steel may undergo a treatment for globularization of sulfides performed with calcium, which has the effect of improving the bending angle, due to MnS globularization. Hence, the steel composition may comprise at least 0.0005% of Ca, up to 0.005%.

The balance of the composition of the steel consists of iron and unavoidable impurities resulting from the smelting.

As explained above, the inventors have discovered that the lack of adhesion of the coating of a steel part, produced by hot-stamping a hot-rolled and coated steel sheet, results from intergranular oxidation present on the surface of the hot-rolled and coated steel sheet, prior to hot-stamping, and through a certain thickness.

First, the inventors have sought a criterion that has to be satisfied by the hot stamped coated steel part to guarantee a satisfactory adhesion of the coating.

The inventors have found that the quality of the coating adhesion can be assessed by determining the surface percentage of porosities in the coating.

The surface percentage of porosities in the coating is determined on the hot stamped coated steel part, i.e. after hot-stamping and cooling to the room temperature.

The surface percentage of porosities in the coating is determined by observing five different cross-sections from a sample under optical microscope, with a ×1000 magnification.

Each cross-section has a length lref, which is selected to characterize the coating in a representative manner. The length lref is chosen as 150 μm.

As illustrated on FIG. 1, for each cross-section, an image analysis is performed, by means of an image analysis, for example Olympus Stream Essentials®, to determine the surface percentage of the porosities in the coating in this cross-section. To that end, the upper and lower boundaries B1 and B2 of the coating are identified. Especially, the upper boundary follows the contour of the coating, at the interface with the surrounding environment, and the lower boundary separates the steel material from the coating. Then, the total surface occupied by the coating, including the porosities P, between the lower and upper boundaries is determined, and the surface occupied by the porosities which are located between the lower and the upper boundaries is assessed (grey colored areas on FIG. 1). The surface percentage of porosities in the coating of the cross-section under consideration is then computed as the ratio between the surface occupied by the porosities and the total surface occupied by the coating (multiplied by 100).

Finally, the surface percentage of porosities in the coating is determined as the average of the five values thus obtained.

The coating adhesion is considered as satisfactory if the surface percentage of porosities in the coating is lower than or equal to 3%. By contrast, if the surface percentage of porosities in the coating is higher than 3%, the coating adhesion is considered as unsatisfactory.

Furthermore, the inventors have identified two criteria that have to be satisfied, by the hot-rolled steel substrate and the hot-rolled steel sheet respectively, to ensure that the thickness of the coating can be controlled to be in the targeted range, especially in the range from 10 to 33 μm, for example between 20 and 33 μm or between 10 and 20 μm, and that, after stamping, the adhesion of the coating will be satisfactory.

The first criterion is related to the surface state of the hot-rolled steel substrate, after pickling and before coating.

Especially, as explained above, the developed surface of the hot-rolled steel substrate just before coating must be controlled to avoid intense iron dissolution from steel surface and uncontrolled growth of the intermetallic layer during hot-dipping in the bath, which would result in the impossibility to control the coating thickness within the targeted range.

Indeed, the intergranular oxidation of the hot-rolled steel substrate can be reduced by intensive pickling, which in turns allows reducing the intergranular oxidation of the hot-rolled steel sheet. However, owing to this intensive pickling, the substrate would have a surface state (i.e. a developed surface) incompatible with the control of the coating thickness.

The inventors have found that in order to ensure that the coating thickness will be comprised in the targeted range, i.e. comprised between 10 and 33 μm, the thickness of the intermetallic layer formed during the coating must remain lower than 15 μm, and that in order to obtain a thickness of the intermetallic layer lower than 15 μm, the surface percentage of voids in the surface region of the hot-rolled steel substrate, after any pickling and before coating, must be lower than 30%. The thickness of the intermetallic layer here designates the thickness of the intermetallic layer of the coating of the hot-rolled and coated steel sheet.

The criterion on the surface percentage of voids must in particular be met in the region of the hot-rolled steel substrate that was located at the core and axis region of the coil during the coiling.

Figure 2:
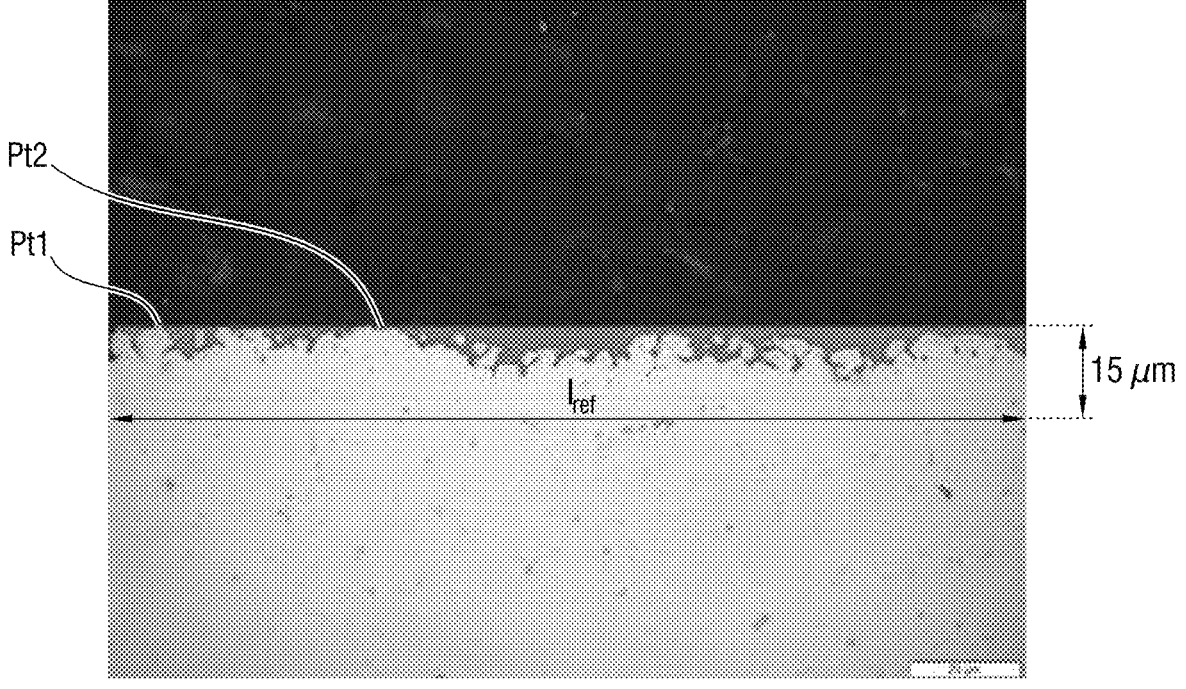
FIG. 2 is a cross-section of a hot-rolled steel substrate, prior to coating and hot-stamping, illustrating the determination of the surface percentage of voids at the surface of the hot-rolled steel substrate.

As illustrated on FIG. 2, the surface region is defined as the region extending from the upper point of the surface of the hot-rolled steel substrate to a depth, from this upper point, of 15 μm. The surface percentage of voids in the surface region is determined from five distinct cross-sections representative of the hot-rolled steel substrate, each cross-section having a length lref of 150 μm. The cross-sections are preferably taken from a sample collected from the core and axis region of the coil. On each cross-section, a sample surface region is determined by means of an image analysis, for example Olympus Stream Essentials®, as a rectangular region whose upper side joins the two higher points Pt1 and Pt2 of the surface profile of the cross-section, and whose lower side is distant from the upper side of 15 μm. Hence, each sample surface region has a length lref of 150 μm and a depth of 15 μm.

For each cross-section, the regions of the sample surface region which are not steel are identified, and the total surface of these regions is determined. The surface percentage of voids in the sample surface region is then determined as the ratio between the total surface of the regions which are not steel and the total surface of the sample surface region, multiplied by 100. Finally, the surface percentage of voids of the hot-rolled and pickled steel substrate is determined as the average of the five values thus obtained.

The second criterion is a maximal depth of intergranular oxidation of the hot-rolled steel sheet, i.e. of the steel product after the coating. Indeed, the inventors have discovered that in order to obtain a satisfactory coating adhesion after hot-stamping, the depth of intergranular oxidation of the hot-rolled steel sheet must be lower than 4 μm.

This criterion must in particular be met in the region of the hot-rolled and coated steel sheet that was located at the core and axis region of the coil during the coiling.

The depth of intergranular oxidation is determined on the hot-rolled and coated steel sheet, i.e. after coating.

The depth of intergranular oxidation is defined as the thickness of the region of the hot-rolled steel sheet, from the surface of the hot-rolled steel sheet (i.e. from the interface between the coating and the hot-rolled steel sheet) towards the inside of the hot-rolled steel sheet, in a direction orthogonal to this surface, in which intergranular oxidation is observed.

Especially, the intergranular oxidation is observed with an optical microscope with a ×1000 magnification, on five different cross-sections, each having a length lref of 150 μm, from a sample collected from the core and the axis region of the coil. On each cross-section, the maximal depth of the intergranular oxidation is measured. Finally, the depth of intergranular oxidation is determined as the average of the five values thus obtained.

Hence, in order to ensure that, after coating, the coating thickness can be controlled to be in the targeted range and that, after hot-stamping, the coating adhesion will be satisfactory, i.e. the surface percentage of porosities in the coating will be lower than or equal to 3%, the two following conditions must be met:
the surface percentage of voids in the surface region of the hot-rolled steel substrate, after pickling and before coating, must be lower than 30%, and
the depth of intergranular oxidation of the hot-rolled steel sheet, after pickling and coating, must be lower than 4 μm.

Hot rolled steel products can be produced by casting a steel having a composition as mentioned above so as to obtain a steel semi-product, reheating the steel semi-product at a temperature Treheat comprised between 1150° C. and 1300° C., and hot rolling the reheated steel semi-product, with a final rolling temperature FRT, to obtain a hot-rolled steel product. The temperature Treheat is for example comprised between 1150° C. and 1240° C.

The final rolling temperature FRT is generally comprised between 840° C. and 1000° C.

The hot-rolling reduction is adapted so that the hot-rolled steel product has a thickness comprised between 1.8 mm and 5 mm, for example comprised between 3 mm and 5 mm.

The hot-rolled steel product is then cooled on the run-out table to reach the coiling temperature Tcoil, and coiled to obtain a hot-rolled steel substrate.

The coiling temperature Tcoil is selected so as to avoid or at least limit intergranular oxidation.

Especially, the coiling temperature Tcoil is selected so that the depth of intergranular oxidation of the hot-rolled steel substrate is lower than 5 μm. Indeed, if the depth of intergranular oxidation of the hot-rolled steel substrate is lower than 5 μm, the depth of intergranular oxidation of the hot-rolled steel sheet, after the coating, will remain lower than 4 μm. Still preferably, the coiling temperature Tcoil is selected so that no intergranular oxidation occurs.

With a steel composition according to the first aspect, the inventors have found that to obtain a depth of intergranular oxidation of the hot-rolled steel sheet of less than 4 μm, the coiling temperature Tcoil must be lower than a maximum coiling temperature Tcoilmax, which depends on the austenite fraction just before the coiling, denoted fγ.

Indeed, a high austenite fraction fγ just before the coiling will result in a substantial transformation of the austenite during the coiling, hence to an important increase in the temperature, especially in the coil and axis region of the sheet during the coiling. By contrast, if the austenite fraction fγ just before the coiling is low, no or little transformation of the austenite will occur during the coiling, so that the increase in the temperature of the sheet will be reduced.

As a consequence, the maximal coiling temperature Tcoilmax is a decreasing function of the austenite fraction fγ just before the coiling.

The inventors have discovered that, in order to obtain a depth of intergranular oxidation in the hot-rolled steel sheet of less than 4 μm, the maximal coiling temperature Tcoilmax is expressed as:

$$T_{coilmax=650-140 \times f\gamma}$$

wherein $T_{coilmax}$ is expressed in degrees Celsius, and fγ designates the austenite fraction in the steel just before the coiling, comprised between 0 (corresponding to 0% of austenite) and 1 (corresponding to 100% of austenite). The maximal coiling temperature $T_{coilmax}$ is therefore comprised between 510° C. and 650° C.

Thus, the coiling temperature $T_{coil}$ must satisfy:

$$T_{coil \le 650-140 \times f\gamma}$$

The austenite fraction fγ in the steel just before the coiling can be determined through an electromagnetic (EM) non-contact non-destructive technique, by using a device for detecting magnetic properties of the steel sheet.

The principle of this technique, which is for example described in the document "Online electromagnetic monitoring of austenite transformation in hot strip rolling and its application to process optimization", A. V. Marmulev et al., Revue de Métallurgie 110, pp. 205-213 (2013), is based on the difference between the magnetic properties of the austenite, which is paramagnetic, and the magnetic properties of ferrite, pearlite, bainite and martensite, which are ferromagnetic phases.

A device for determining the austenite fraction fγ is for example disclosed in US 2003/0038630 A1.

The austenite fraction fγ just before the coiling depends on the steel composition, especially on the C content, on the final rolling temperature FRT, and on the cooling process between the final rolling temperature FRT and the coiling temperature Tcoil.

In particular, the higher the C content of the steel, the higher the austenite fraction fγ in the steel sheet just before the coiling. Hence, all other parameters being equal, the higher the C content, the lower the maximal coiling temperature Tcoilmax. Especially, if the C content of the steel is higher than or equal to 0.075%, the austenite fraction in the substrate remains higher than 0.5, so that the coiling temperature Tcoilmax is lower than 580° C.

The maximal coiling temperature Tcoilmax can be determined, for a steel having given composition and thickness, on a given line, the final rolling temperature FRT being fixed, by determining the austenite fraction in the steel product during the cooling from the final rolling temperature FRT, and by comparing, during the cooling, the temperature T of the substrate to the value 650–140 fγ'(T), fγ'(T) being the austenite fraction of the substrate at the temperature T during the cooling.

The maximal coiling temperature $T_{coilmax}$ is the temperature at which T=650–140 fγ'(T).

Generally, the coiling temperature is preferably lower than 580° C., still preferably lower than 570° C.

However, the coiling temperature should remain higher than 450° C., in order to avoid an undesired increase in the mechanical properties of the steel that would result from a low coiling temperature.

Under these conditions, the intergranular oxidation in the hot-rolled steel substrate is limited, so that the depth of intergranular oxidation of the hot-rolled steel sheet after coating will be lower than 4 μm.

With a steel composition according to the second aspect, the inventors have found that to obtain a depth of intergranular oxidation of the hot-rolled steel sheet of less than 4 μm, the coiling temperature Tcoil must be even restricted compared to compositions according to the first aspect, and set to values lower than or equal to 495° C.

The rules given above to ensure in parallel coating adhesion and coating thickness in the targeted range are still valid. However, due to the presence of Ni higher or equal to 0.25%, they are not sufficient to induce at the same time a good productivity at the pickling line. Indeed, the inventors discovered that the presence of Ni higher than 0.25% induces a higher scale adherence at the hot strip mill. The presence of such scale, highly adherent to the surface, impairs the coatability of the sheet. This scale could be removed by intense pickling, which would however highly reduce the productivity at the pickling line. The inventors have found that reducing the coiling temperature lower or equal than Tcoilmax=495° C. could help reducing scale amount formed on the run out table at hot strip mill. Therefore, metallic Nickel formed at the interface between scale and steel is reduced, which finally facilitates scale breaking and pickling at the pickling line, and consequently provides a process with higher productivity at this latter line.

After coiling, the hot-rolled steel substrate is pickled. Since the depth of intergranular oxidation is limited, the pickling conditions do not have an influence on the adhesion of the coating after hot-stamping or on the thickness of the coating.

Especially, even if a light pickling is performed, owing to the low depth of intergranular oxidation before pickling, the depth of intergranular oxidation in the hot-rolled steel sheet after pickling and coating will in any case be lower than 4 μm so that little or no carbon oxides will be formed during the heating prior to hot-forming, and that the coating adhesion after hot-stamping will not be impaired.

Besides, even if intensive pickling is performed, owing to the low depth of intergranular oxidation before pickling, the surface percentage of voids in the surface region of the hot-rolled steel substrate after pickling will remain lower than 30%. Hence, no intense iron dissolution from steel surface and no uncontrolled growth of the intermetallic layer will occur during the hot-dip coating of the steel sheet in the bath, and the thickness of the coating can be controlled to the targeted thickness.

The pickling is for example performed in a HCl bath, for a time comprised between 15 and 65 s.

The hot-rolled steel substrate, which is pickled, thus obtained therefore satisfies the first criterion defined hereinabove, i.e. has a surface percentage of voids in the surface region lower than 30%. Besides, the hot-rolled and pickled steel sheet has no or little intergranular oxidation, which allows satisfying the second criterion defined above, i.e. obtaining a depth of intergranular oxidation lower than 4 μm in the hot-rolled steel sheet after coating.

After pickling, the hot-rolled and pickled steel substrate may be oiled or may be applied an organic film, for example Easyfilm® HPE, to temporarily protect the surface of the sheet.

The hot-rolled and pickled steel substrate is then continuously hot-dip coated in a bath, with either Al or an Al-alloy, so as to obtain a hot-rolled and coated steel sheet.

For example, the coating may be an Al—Si coating. A typical bath for an Al—Si coating generally contains in its basic composition, by weight percent, from 8% to 11% of silicon, from 2% to 4% of iron, the remainder being aluminum or aluminum alloy, and impurities inherent to the processing. Alloying elements present with aluminum include strontium and/or calcium, between 15 and 30 ppm each.

As another example, the coating may be a Zn—Al—Mg coating. A typical bath for a Zn—Al—Mg coating contains, by weight percent, between 0.1% and 10% of magnesium, between 0.10% and 20% of aluminum, the remainder being Zn or Zn-alloy, optional additional elements such as Si, Sb, Pb, Ti, Ca, Mn, Sn, La, Ce, Cr, Ni, Zr and/or Bi, and impurities inherent to the processing.

For example, the bath contains between 0.5% to 8% of aluminum, between 0.3% and 3.3% of magnesium, the remainder being Zn or Zn-alloy, optional additional elements such as Si, Sb, Pb, Ti, Ca, Mn, Sn, La, Ce, Cr, Ni, Zr and/or Bi, and impurities inherent to the processing.

As another example, the coating is an Al—Zn—Si—Mg coating.

A first example of bath for a Al—Zn—Si—Mg coating contains, by weight percent, from 2.0% to 24.0% of zinc, from 7.1% to 12.0% of silicon, optionally from 1.1% to 8.0% of magnesium, and optionally additional elements chosen from Pb, Ni, Zr or Hf, the content of each additional element being inferior to 0.3%, the balance being aluminum and unavoidable impurities and residual elements, the ratio Al/Zn being above 2.9.

A second example of bath for a Al—Zn—Si—Mg coating contains, by weight percent, from 4.0% to 20.0% of zinc, from 1% to 3.5% of silicon, optionally from 1.0% to 4.0% of magnesium, and optionally additional elements chosen from Pb, Ni, Zr or Hf, the content of each additional element being inferior to 0.3%, the balance being aluminum and unavoidable impurities and residual elements, the ratio Zn/Si being comprised between 3.2 and 8.0.

A third example of bath for a Al—Zn—Si—Mg coating contains, by weight percent, from 2.0% to 24.0% of zinc, from 1.1% to 7.0% of silicon, optionally from 1.1% to 8.0% of magnesium when the amount of silicon is between 1.1 and 4.0%, and optionally additional elements chosen from Pb, Ni, Zr or Hf, the content of each additional element being inferior to 0.3%, the balance being aluminum and unavoidable impurities and residual elements, the ratio Al/Zn being above 2.9.

After the deposition of the coating by hot-dipping, the coated steel sheet is usually wiped with nozzles ejecting gas on both sides of the coated steel sheet, and the coated steel sheet is then cooled.

The hot-rolled and coated steel sheet thus obtained comprises a hot-rolled steel sheet and, on each side of the hot-rolled steel sheet, an Al or an Al alloy coating.

The hot-rolled steel sheet generally has a ferrito-pearlitic structure, i.e. a structure consisting of ferrite and pearlite.

The thickness of the Al or Al alloy coating, on each side of the hot-rolled steel sheet, is comprised between 10 μm and 33 μm.

According to a first embodiment, the thickness of the coating is controlled to be comprised in the range between 20 μm and 33 μm.

According to a second embodiment, the thickness of the coating is controlled to be comprised in the range between 10 μm and 20 μm.

According to a third embodiment, the thickness coating is controlled to be in the range between 15 μm and 25 μm.

After the coating, the depth of intergranular oxidation in the hot-rolled steel sheet remains lower than 4 μm, generally lower than 3 μm owing to the pickling. This depth extends from the surface of the hot-rolled steel sheet (i.e. the surface which separates the hot-rolled steel sheet from the coating) towards the inside of the steel sheet.

Moreover, owing to the low surface percentage of voids in the surface region of the hot-rolled steel substrate before coating, even after pickling, the thickness of the coating is comprised within the targeted thickness range, especially between 10 μm and 33 μm, on each side of the hot-rolled and coated steel sheet, and at every location on each side of the hot-rolled and coated steel sheet.

The hot-rolled and coated steel sheet is destined to be hot-stamped.

To that end, the hot-rolled and coated steel sheet is cut to obtain a blank. Optionally, this blank may be welded to a second blank, to thereby obtain a tailor welded blank (TWB) comprising a first blank cut from a hot-rolled and coated steel sheet according to the present disclosure and a second blank. The second blank may also be obtained from a hot-rolled and coated steel sheet according to the present disclosure, or may be a blank cut from a cold-rolled and coated steel sheet. Especially, the first blank, having a thickness comprised between 1.8 mm and 5 mm, may be welded to a second blank having a different thickness and/or made from a steel having a different composition. The second blank is preferably made of a steel having a composition comprising, by weight percent:

0.04%≤C≤0.38%,
    0.40%≤Mn≤3%,
    0.005%≤Si≤0.70%,
    0.005%≤Al≤0.1%,
    0.001%≤Cr≤2%,
    0.001%≤Ni≤2%,
    0.001%≤Ti≤0.2%,
    Nb≤0.1%,
    B≤0.010%,
    0.0005%≤N≤0.010%,
    0.0001%≤S≤0.05%,
    0.0001%≤P≤0.1%,
    Mo≤0.65%,
    W≤0.30%,
    Ca≤0.006%,
the balance of the composition consisting of iron and unavoidable impurities resulting from the smelting.

The second blank may also be made of a steel having a composition comprising, by weight percent:

either 0.24%≤C≤0.38% and 0.40%≤Mn≤3%
    or 0.38%≤C≤0.43% and 0.05%≤Mn≤0.40%,
    0.10%≤Si≤0.70%,
    0.015%≤Al≤0.070%,
    0.001%≤Cr≤2%,
    0.25%≤Ni≤2%,
    0.015%≤Ti≤0.1%,
    0%≤Nb≤0.06%,
    0.0005%≤B≤0.0040%,
    0.003%≤N≤0.010%,
    0.0001%≤S≤0.005%,
    0.0001%≤P≤0.025%,
    the titanium and nitrogen contents satisfying the following relationship:
    Ti/N>3.42,
    the carbon, manganese, chromium and silicon contents satisfying the following relationship:

$$2.6C + \frac{Mn}{5.3} + \frac{Cr}{13} + \frac{Si}{15} \geq 1.1\%,$$

the chemical composition optionally comprising one of several of the following elements:

0.05%≤Mo≤0.65%,
    0.001% W≤0.30%,
    0.0005%≤Ca≤0.005%,
    the balance of the composition consisting of iron and unavoidable impurities resulting from the smelting.

For sake of simplification, the term "blank" will be used hereinafter to designate a blank obtained from a hot-rolled and coated steel sheet according to the present disclosure, or a tailor welded blank including this blank.

The blank is then submitted to a heat treatment in a furnace prior to hot-stamping, and hot-stamped to obtain a hot-stamped coated steel part.

Especially, the blank is heated in a furnace to a temperature Tc which makes it possible to achieve in the steel substrate, at least partial transformation into austenite. This temperature is for example comprised between 860° C. and 950° C., and generally comprised between 880° C. and 950° C., thus a heated blank is obtained.

The heated blank is then removed from the furnace and transferred from the furnace to a die, where it undergoes a hot deformation (hot-stamping), for the purpose of obtaining the desired geometry of the part to obtain a hot-stamped blank. The hot-stamped blank is cooled down to 400° C. at a cooling rate Vr which is preferably of more than 10° C./s, still preferably of more than 30° C./s, thereby obtaining a hot-stamped coated steel part.

The hot-stamped coated steel part which is thus obtained has a very satisfactory coating adhesion.

Especially, the surface percentage of porosities in the coating of the hot-stamped coated steel part is lower than or equal to 3%.

In addition, after painting, for example by spraying, the painting adhesion is very satisfactory. The painting adhesion can in particular be assessed by performing a wet painting adhesion test according to the standard ISO 2409:2007. The painting adhesion is considered as good if the result of the wet painting adhesion test is lower than or equal to 2, and poor if the result of the wet painting adhesion test is higher than 2.

Examples

Hot-rolled and coated steel sheets were produced by casting semi-products having the compositions disclosed in Table 1, by weight percent:

TABLE 1

| Steel | C (%) | Mn (%) | Si (%) | Al (%) | Cr (%) | Ni (%) | Ti (%) | Nb (%) | B (%) | N (%) | S (%) | P (%) | Mo (%) | W (%) | Ca (%) |
|---|---|---|---|---|---|---|---|---|---|---|---|---|---|---|---|
| A | 0.23 | 1.13 | 0.24 | 0.037 | 0.159 | 0.013 | 0.036 | 0.001 | 0.0016 | 0.005 | 0.0017 | 0.015 | 0.003 | 0.003 | 0.0016 |
| B | 0.06 | 1.64 | 0.022 | 0.024 | 0.027 | 0.016 | 0.067 | 0.048 | — | 0.005 | 0.004 | 0.016 | 0.003 | 0.002 | 0.0015 |
| C | 0.36 | 1.24 | 0.226 | 0.032 | 0.111 | 0.105 | 0.034 | 0.001 | 0.0032 | 0.006 | 0.0014 | 0.015 | 0.021 | 0.004 | 0.0021 |
| D | 0.344 | 0.61 | 0.541 | 0.030 | 0.354 | 0.417 | 0.034 | 0.038 | 0.0039 | 0.005 | 0.0004 | 0.008 | 0.205 | 0.003 | 0.0006 |
| E | 0.07 | 1.62 | 0.36 | 0.040 | 0.09 | 0.012 | 0.021 | 0.051 | 0.0030 | 0.006 | 0.0010 | 0.012 | — | 0.003 | 0.0004 |

The Ni contents reported in Table 1 for steels A, B and E correspond to the presence of Ni as a residual (or impurity).

The semi-products were hot-rolled down to a thickness th, with a final rolling temperature FRT.

The hot-rolled steel products were cooled to a coiling temperature Tcoil and coiled at the coiling temperature Tcoil, to obtain hot-rolled steel substrates.

The hot-rolled steel substrates were then pickled in an HCl bath, for a time tpickling. After pickling, samples were taken from the core and axis region of the hot-rolled steel substrates, and for each sample, the surface percentage of voids in the surface region was determined according to the procedure described hereinabove.

The hot-rolled steel substrates were then hot-dip coated. Table 2 displays the bath compositions used for hot dipping the samples. A coating thickness comprised between 20 and 33 μm on each side of the sheet was targeted.

TABLE 2

| Coating | Si (%) | Fe (%) | Zn (%) | Mg (%) | Al (%) + impurities |
|---|---|---|---|---|---|
| α | 9 | 3 | <0.1 | <0.1 | 88 |
| β | 3.4 | 1.4 | 15.6 | 1.8 | 77.8 |

After hot dip coating, some of the hot rolled and coated sheets were subjected to a 0.7 μm Zn deposition on the Al-alloy coating through electrodeposition.

After coating, samples were taken from the core and axis region of the sheets, and for each sample, the depth of intergranular oxidation was determined according to the procedure described hereinabove. In addition, the thickness of the coating and the thickness of the intermetallic layer were determined.

The hot-rolled and coated steel sheets thus obtained were cut to obtain blanks. The blanks cut from the core and axis region of the hot-rolled and coated steel sheets were heated in a furnace to a temperature of 920° C. for a time tc. This time tc includes the heating phase to the targeted temperature and the holding phase at this temperature. The heated blanks were then transferred to a die, hot-stamped and cooled down to the room temperature.

From each hot-stamped coated part, a sample was taken, and the coating adhesion was assessed by determining the surface percentage of porosities in the coating according to the procedure described above. Furthermore, the coating thickness was measured.

Finally, an electro-deposited painting of 20 μm was applied on one side of each part, and the adhesion of the painting on the parts was assessed by a wet painting adhesion test according to the standard ISO 2409:2007. The painting adhesion was considered as good if the result of this test was lower than or equal to 2, or poor if the result of this test was higher than 2.

In all these examples, the width of the sheets was equal to 1 m.

The manufacturing conditions (steel composition, thickness th after hot-rolling, final rolling temperature FRT, austenite fraction just before the coiling fγ and maximal coiling temperature $T_{coilmax}$, coiling temperature $T_{coil}$, pickling time $t_{pickling}$ and heating time $t_C$) for each part are indicated in Table 3.

TABLE 3

| Sample | Steel | Coating | Zn coating electrodeposition | th (mm) | FRT (° C.) | fγ | $T_{coilmax}$ (° C.) | $T_{coil}$ (° C.) | $t_{pickling}$ (s) | $t_C$ (s) |
|---|---|---|---|---|---|---|---|---|---|---|
| 1 | A | α | NO | 3.3 | 875 | 0.65 | 559 | 585 | 25 | 600 |
| 2 | A | α | NO | 3.3 | 875 | 0.65 | 559 | 655 | 45 | 600 |
| 3 | A | α | NO | 3.3 | 875 | 0.65 | 559 | 585 | 45 | 600 |
| 4 | A | α | NO | 3.3 | 875 | 0.65 | 559 | 585 | 375 | 600 |
| 5 | A | α | NO | 3.3 | 850 | 0.61 | 565 | 540 | 375 | 600 |
| 6 | A | α | NO | 3.3 | 850 | 0.59 | 567 | 515 | 16 | 600 |
| 7 | A | α | NO | 3.3 | 850 | 0.59 | 567 | 515 | 21 | 600 |
| 8 | A | α | NO | 3.3 | 885 | 0.87 | 528 | 520 | 28 | 600 |
| 9 | A | α | NO | 3.3 | 885 | 0.87 | 528 | 520 | 35 | 600 |
| 10 | A | α | NO | 3.3 | 905 | 0.88 | 527 | 510 | 26 | 600 |
| 11 | A | α | NO | 3.3 | 905 | 0.88 | 527 | 510 | 23 | 600 |
| 12 | A | α | NO | 3.3 | 865 | 0.61 | 565 | 533 | 63 | 600 |
| 13 | A | α | NO | 3.3 | 905 | 0.87 | 528 | 519 | 22 | 600 |
| 14 | A | α | NO | 3.3 | 904 | 0.87 | 528 | 515 | 15 | 600 |
| 15 | A | α | NO | 3.3 | 867 | 0.64 | 560 | 554 | 52 | 600 |
| 16 | A | α | NO | 3.3 | 861 | 0.64 | 560 | 548 | 24 | 600 |
| 17 | A | α | NO | 3.3 | 851 | 0.85 | 531 | 476 | 45 | 600 |
| 18 | A | α | NO | 3.3 | 857 | 0.83 | 534 | 504 | 60 | 600 |

TABLE 3-continued

| Sample | Steel | Coating | Zn coating electrodeposition | th (mm) | FRT (° C.) | fγ | $T_{coilmax}$ (° C.) | $T_{coil}$ (° C.) | $t_{pickling}$ (s) | $t_C$ (s) |
|---|---|---|---|---|---|---|---|---|---|---|
| 19 | B | α | NO | 2.6 | 845 | 0.1 | 636 | 655 | 41 | 520 |
| 20 | B | α | NO | 2.6 | 905 | 0.1 | 636 | 555 | 25 | 520 |
| 21 | B | α | NO | 2.6 | 845 | 0.1 | 636 | 555 | 60 | 520 |
| 22 | C | α | NO | 3.2 | 905 | 0.8 | 538 | 655 | 21 | 600 |
| 23 | D | α | NO | 3.2 | 875 | 0.9 | 495 | 531 | 28 | 600 |
| 24 | D | α | NO | 3.2 | 872 | 0.9 | 495 | 495 | 38 | 600 |
| 25 | D | α | NO | 3.2 | 874 | 0.9 | 495 | 581 | 20 | 600 |
| 26 | E | α | NO | 3.3 | 880 | 0.5 | 580 | 545 | 24 | 600 |
| 27 | A | β | NO | 3.1 | 885 | 0.65 | 559 | 655 | 25 | 600 |
| 28 | A | β | NO | 3.1 | 885 | 0.84 | 532 | 515 | 21 | 600 |
| 29 | A | α | YES | 3.3 | 862 | 0.62 | 563 | 515 | 22 | 600 |

In this table, the underlined values are not according to the present disclosure.

The properties measured on each hot-rolled steel substrate, sheet or part (surface percentage of voids SVSS in the surface region of the hot-rolled steel substrate, depth of intergranular oxidation DIO of the hot-rolled steel sheet, coating thickness Ct, thickness IMt of the intermetallic layer, and surface percentage of porosities in the coating of the hot-stamped part $SP_{coating}$, and quality of the painting adhesion—good or poor) are indicated in Table 4.

TABLE 4

| Sample | $SV_{SS}$ (%) | $D_{IO}$ (μm) | $C_t$ (μm) | $IM_t$ (μm) | $SP_{coating}$ <3%? | Painting adhesion |
|---|---|---|---|---|---|---|
| 1 | 18.1 | 5 | 27.5 | 11.4 | NO | Poor |
| 2 | 17.1 | 10 | 30.52 | 8.6 | NO | Poor |
| 3 | 17.5 | 4 | 27.9 | 11.2 | NO | Poor |
| 4 | 37.1 | NA | 37.6 | 37.6 | YES | Good |
| 5 | 5.7 | 0 | 31.8 | 10.9 | YES | Good |
| 6 | 18.2 | 0 | 31.2 | 12.8 | YES | Good |
| 7 | 11 | 0 | 29 | 11 | YES | Good |
| 8 | 15.3 | 0 | 29.6 | 12 | YES | Good |
| 9 | 19.9 | 0 | 24.3 | 10.4 | YES | Good |
| 10 | nd | 2 | 23 | 10.4 | YES | Good |
| 11 | 11.5 | 2 | 21.3 | 11.7 | YES | Good |
| 12 | 10.8 | 0 | 21.9 | 10.3 | YES | Good |
| 13 | 14.2 | 2 | 26.9 | 12.6 | YES | Good |
| 14 | 14.4 | 0 | 28.4 | 10.5 | YES | Good |
| 15 | 20.2 | 0 | 23.5 | 10.2 | YES | Good |
| 16 | 13.9 | 0 | 22.7 | 10.9 | YES | Good |
| 17 | 13 | 0 | 26.5 | 9.9 | YES | Good |
| 18 | 16 | 0 | 27.2 | 11.1 | YES | Good |
| 19 | nd | 9 | 28.2 | 8.7 | NO | Poor |
| 20 | nd | 0 | 22.6 | 11.8 | YES | Good |
| 21 | nd | 0 | 26.8 | 10.3 | YES | Good |
| 22 | nd | 12 | 30 | 10 | NO | Poor |
| 23 | nd | 8 | 27.6 | 10.1 | NO | Poor |
| 24 | nd | 0 | 24.9 | 9.9 | YES | Good |
| 25 | nd | 9 | 28.4 | 11.5 | NO | Poor |
| 26 | 7.0 | 0 | 27.1 | 11 | YES | Good |
| 27 | nd | 13 | 23 | 7 | NO | Poor |
| 28 | nd | 2 | 28.1 | 10.7 | YES | Good |
| 29 | nd | 0 | 26.2 | 11.1 | YES | Good |

In Table 4, nd means "non determined", and NA means "not applicable".

Samples 1-4, 19, 22, 23, 25 and 27 were produced with coiling temperatures not in accordance with the present disclosure. Especially, samples 1-4, 19, 22, 23, 25 and 27 were coiled at a temperature higher than the maximal coiling temperature $T_{coilmax}$, leading to a high depth of intergranular oxidation before pickling.

Samples 1-3, 19, 22, 23, 25 and 27 were pickled under normal conditions, i.e. during a time comprised between 15 and 65 s. As a consequence of the coiling temperature and pickling conditions, the depth of intergranular oxidation of the steel sheet (measured after coating) for samples 1-3 19, 22, 23, 25 and 27 is higher than or equal to 4 μm, i.e. higher than the maximal depth of oxidation admissible.

Thus, after hot-stamping, the surface percentage of porosities in the coating being higher than 3%, and the painting adhesion is poor.

In addition, example 23, made of steel E comprising 0.417% of Ni, was coiled at a temperature of 531° C. As a consequence, a large amount of scale, adherent to the surface, was present on the sheet before pickling and after pickling. The removal of this scale would have required performing an intensive pickling, which would however have highly reduced the pickling line productivity.

Similar results could have been obtained by using a coiling temperature lower than 531° C. but higher than 495° C. Sample 4 was intensively pickled, during a time of 375 s. As a consequence of the coiling temperature and pickling conditions, even if the hot-rolled steel sheet does not comprise intergranular oxidation after coating, the surface percentage of voids in the surface region of the steel substrate before coating was very high (37.1%). As a result, an uncontrolled growth of the intermetallic layer occurred during the hot-dip coating, so that the coating thickness could not be controlled in the range 20-33 μm, the coating thickness for sample 4 being 37.6 μm.

By contrast, Sample 5 was intensively pickled, during the same time as Sample 4, but, unlike Sample 4, was produced with a coiling temperature in accordance with the present disclosure. Hence, before pickling, the hot-rolled steel substrate comprised no or little intergranular oxidation, so that, after pickling, the surface percentage of voids in the surface region of the steel substrate was low (5%), contrary to Sample 4. As a result, the coating thickness could be controlled in the range 20-33 μm. The comparison of Samples 4 and 5 thus illustrates that the manufacturing conditions according to the present disclosure allow achieving an improved coating adhesion after hot-stamping, and an excellent painting adhesion whilst allowing the control of the coating thickness.

Besides, the comparison of Samples 5 and 6, which are pickled either intensely (Sample 5) or slightly (Sample 6) shows that, under the condition that the coiling temperature is selected according to the present disclosure, the intensity of the pickling has no influence on the coating adhesion and does not affect the control of the coating thickness.

These results show that, in the process of the present disclosure, the intensity of the pickling can be reduced without impairing the coating adhesion after hot-stamping. The process of the present disclosure thus does not necessitate an intensive pickling. Therefore, the process of the present disclosure allows producing a hot-rolled and coated steel sheet having a thickness comprised between 1.8 mm and 5 mm with an improved coating adhesion after hot-stamping, whilst allowing the control of the thickness of the coating of the hot-rolled and coated steel sheet to the targeted range, especially in the range comprised between 10 and 33 μm, and without reducing productivity at the pickling line.

Samples 5 to 18, 20, 21, 24, 26, 28 and 29 show that when the hot-rolled and coated steel sheet is produced by a method according to the present disclosure, the hot-rolled steel sheet comprises no or little intergranular oxidation, so that the surface percentage of porosities in the coating of the hot-stamped part SPcoating is low, and the painting adhesion is good. In addition, the depth of intergranular oxidation before pickling is low, so that the surface percentage of voids in the surface region of the steel substrate before coating is low. As a consequence, the coating thickness can be controlled in the range 20-33 μm.

Especially, sample 24 is made of steel D, having a composition according to the second aspect of the present disclosure. The coiling temperature was lower than or equal to 495° C. As a consequence of the coiling temperature, the hot-rolled steel sheet comprises no or little intergranular oxidation, the surface percentage of porosities in the coating of the hot-stamped part SPcoating is low, and the painting adhesion is good. In addition, the depth of intergranular oxidation before pickling is low, so that the surface percentage of voids in the surface region of the steel substrate before coating is low. As a consequence, the coating thickness can be controlled in the range 20-33 μm. Furthermore, pickling time could be reduced to achieve a high productivity at the pickling line.

What is claimed is:

1. A hot-rolled and coated steel sheet, comprising:
(i) a hot-rolled steel sheet having a thickness between 1.8 mm and 5 mm, the hot-rolled steel sheet not being cold-rolled, the hot-rolled steel sheet being made of a steel having a composition comprising, by weight percent:
0.04%≤C≤0.38%,
0.40%≤Mn≤3%,
0.005%≤Si≤0.70%,
0.005%≤Al≤0.1%,
0.001%≤Cr≤2%,
0.001%≤Ni≤2%,
0.001%≤Ti≤0.2%,
Nb≤0.1%,
B≤0.010%,
0.0005%≤N≤0.010%,
0.0001%≤S≤0.05%,
0.0001%≤P≤0.1%,
Mo≤0.65%,
W≤0.30%,
Ca≤0.006%,
a balance of the composition consisting of iron and unavoidable impurities resulting from smelting,
said hot-rolled steel sheet having a depth of intergranular oxidation of less than 4 μm, said hot-rolled steel sheet having a structure consisting of ferrite and pearlite, and
(ii) an Al or an Al alloy coating, having a thickness between 10 and 33 μm, on each side of the hot-rolled steel sheet.

2. The hot-rolled and coated steel sheet according to claim 1, wherein the composition comprises, by weight percent:
0.04%≤C≤0.38%,
0.40%≤Mn≤3%, 0.005%≤Si≤0.70%,
0.005%≤Al≤0.1%,
0.001%≤Cr≤2%,
0.001%≤Ni≤0.1%,
0.001%≤Ti≤0.2%,
Nb≤0.1%,
B≤0.010%,
0.0005%≤N≤0.010%,
0.0001%≤S≤0.05%,
0.0001%≤P≤0.1%,
Mo≤0.65%,
W≤0.30%
Ca≤0.006%,
the balance of the composition consisting of iron and unavoidable impurities resulting from the smelting.

3. The hot-rolled and coated steel sheet according to claim 2, wherein the composition comprises, by weight percent:
0.04%≤C≤0.38%,
0.5%≤Mn≤3%,
0.005%≤Si≤0.5%,
0.005%≤Al≤0.1%,
0.001%≤Cr≤1%,
0.001%≤Ni≤0.1%,
0.001%≤Ti≤0.2%,
Nb≤0.1%,
B≤0.010%,
0.0005%≤N≤0.010%,
0.0001%≤S≤0.05%,
0.0001%≤P≤0.1%,
Mo≤0.10%,
Ca≤0.006%,
the balance of the composition consisting of iron and unavoidable impurities resulting from the smelting.

4. The hot-rolled and coated steel sheet according to claim 1, wherein the composition comprises, by weight percent:
0.075%≤C≤0.38%.

5. The hot-rolled and coated steel sheet according to claim 1, wherein the composition comprises, by weight percent:
0.040%≤C≤0.100%,
0.80%≤Mn≤2.0%,
0.005%≤Si≤0.30%,
0.010%≤Al≤0.070%,
0.001%≤Cr≤0.10%,
0.001%≤Ni≤0.10%,
0.03%≤Ti≤0.08%,
0.015%≤Nb≤0.1%,
0.0005%≤N≤0.009%,
0.0001%≤S≤0.005%,
0.0001%≤P≤0.030%,
Mo≤0.10%,
Ca≤0.006%,
the balance of the composition consisting of iron and unavoidable impurities resulting from the smelting.

6. The hot-rolled and coated steel sheet according to claim 1, wherein the composition comprises, by weight percent:
0.062%≤C≤0.095%,
1.4%≤Mn≤1.9%,
0.2%≤Si≤0.5%,
0.020%≤Al≤0.070%,
0.02%≤Cr≤0.1%,
wherein 1.5%≤(C+Mn+Si+Cr)≤2.7%,
3.4×N≤Ti≤8×N,
0.04%≤Nb≤0.06%,
wherein 0.044%≤(Nb+Ti)≤0.09%,
0.0005%≤B≤0.004%,
0.001%≤N≤0.009%,
0.0005%≤S≤0.003%, 0.001%≤P≤0.020%, and optionally 0.0001%≤Ca≤0.006%, the balance of the composition consisting of iron and unavoidable impurities resulting from the smelting.

7. The hot-rolled and coated steel sheet according to claim 1, wherein the composition comprises, by weight percent:

0.15%≤C≤0.38%, 0.5%≤Mn≤3%, 0.10%≤Si≤0.5%, 0.005%≤Al≤0.1%, 0.01%≤Cr≤1%, 0.001%≤Ti≤0.2%, 0.0005%≤B≤0.010%, 0.0005%≤N≤0.010%, 0.0001%≤S≤0.05%, 0.0001%≤P≤0.1%, the balance of the composition consisting of iron and unavoidable impurities resulting from the smelting.

8. The hot-rolled and coated steel sheet according to claim 1, wherein the hot-rolled and coated steel sheet further comprises, on each side, a Zn coating having a thickness lower than or equal to 1.1 μm.

9. The hot-rolled and coated steel sheet according to claim 1, wherein the hot-rolled steel sheet has a depth of intergranular oxidation lower than 3 μm.

10. The hot-rolled and coated steel sheet according to claim 1, wherein the hot-rolled steel sheet has a depth of intergranular oxidation of 2 μm or less.

11. The hot-rolled and coated steel sheet according to claim 1, wherein the hot-rolled steel sheet has no intergranular oxidation.

12. The hot-rolled and coated steel sheet according to claim 1, wherein the composition of the steel comprises, by weight percent 0.15%≤C≤0.38%.

13. The hot-rolled and coated steel sheet according to claim 12, wherein the composition of the steel comprises, by weight percent 0.40%≤Mn≤1.9%.

14. The hot-rolled and coated steel sheet according to claim 1, wherein the composition of the steel comprises, by weight percent 0.40%≤Mn≤1.9%.

15. The hot-rolled and coated steel sheet according to claim 1, wherein the composition of the steel comprises, by weight percent 0.001%≤W≤0.30%.

16. The hot-rolled and coated steel sheet according to claim 1, wherein the composition comprises, by weight percent 0.36%≤Si≤0.70%.

17. The hot-rolled and coated steel sheet according to claim 1, wherein the composition of the steel comprises, by weight percent 0.027%≤Cr≤0.354%.

18. The hot-rolled and coated steel sheet according to claim 1, wherein a surface percentage of porosities in the coating is lower than or equal to 3%.

19. The hot-rolled and coated steel sheet according to claim 1, wherein an intermetallic layer of the coating has a thickness of less than 15 μm.

20. The hot-rolled and coated steel sheet according to claim 1, wherein the composition of the steel comprises, by weight percent 0.15%≤Mo≤0.25%.

21. The hot-rolled and coated steel sheet according to claim 1, wherein the composition of the steel comprises, by weight percent 0.541%≤Si≤0.70%.

22. The hot-rolled and coated steel sheet according to claim 1, wherein the composition of the steel comprises, by weight percent 0.111%≤Cr≤2%.

23. The hot-rolled and coated steel sheet according to claim 1, wherein the composition of the steel comprises, by weight percent 0.111%≤Cr≤0.354%.

24. The hot-rolled and coated steel sheet according to claim 1, wherein the composition of the steel comprises, by weight percent 0.25%≤Ni≤2%.

25. The hot-rolled and coated steel sheet according to claim 1, wherein the composition of the steel comprises, by weight percent Nb≤0.01%.

26. The hot-rolled and coated steel sheet according to claim 1, wherein the composition of the steel satisfies Si/Mn≤0.22.

27. The hot-rolled and coated steel sheet according to claim 1, wherein the hot-rolled steel sheet has a depth of intergranular oxidation of 2 μm or more and 4 μm or less.

28. The hot-rolled and coated steel sheet according to claim 1, wherein the hot-rolled steel sheet has a depth of intergranular oxidation of 2 μm or more and 3 μm or less.

29. The hot-rolled and coated steel sheet according to claim 26, wherein the hot-rolled steel sheet has a depth of intergranular oxidation of 2 μm or more and 3 μm or less.

\* \* \* \* \*